(12) United States Patent
Zhang et al.

(10) Patent No.: US 7,114,146 B2
(45) Date of Patent: Sep. 26, 2006

(54) SYSTEM AND METHOD OF DYNAMIC SERVICE COMPOSITION FOR BUSINESS PROCESS OUTSOURCING

(75) Inventors: Liang-Jie Zhang, Cortlandt Manor, NY (US); Tian-Jy Chao, Bedford, NY (US); John Y. Sayah, Sleepy Hollow, NY (US); Hung-yang (Henry) Chang, Scarsdale, NY (US); Jen-Yao Chung, Yorktown Heights, NY (US); Qun Zhou, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/428,076

(22) Filed: May 2, 2003

(65) Prior Publication Data

US 2004/0220910 A1 Nov. 4, 2004

(51) Int. Cl.
*G06F 9/45* (2006.01)
(52) U.S. Cl. .................................... 717/106
(58) Field of Classification Search ............... 717/106
See application file for complete search history.

(56) References Cited

U.S. PATENT DOCUMENTS 5,890,132 A * 3/1999 Sanders ..................... 705/7
6,249,769 B1 * 6/2001 Ruffin et al. ................. 705/7
2003/0167455 A1 * 9/2003 Iborra et al. ................ 717/105
2003/0233367 A1 * 12/2003 Uluakar et al. ............. 707/102

OTHER PUBLICATIONS

B. Benatallah et al; "Toward Patterns of Web Services Composition"; UNSW-CSE-TR-0111; Nov. 2001; pp. 1-35.
S. Ponnekanti et al; "Sword: A Developer Toolkit for Building Composite Web Services"; Computer Science Dept, Stanford Univerity; 2002.
D. O'Riordan et al; "Business Process Standards for Web Services"; Tect Publication; Apr. 10, 2002.

* cited by examiner

*Primary Examiner*—John Chavis
(74) *Attorney, Agent, or Firm*—Whitham, Curtis, Christofferson & Cook, PC; Stephen C. Kaufman

(57) ABSTRACT

A system and method for capturing a plurality of business requirements using a Business Process Outsourcing Language (BPOL), an XML representation for expressing business process flow rules, preferences, business rules and event-action mappings as well as service links, to automate the process of generating business processes for use with Web services. BPOL is used to dynamically construct a search script for an advanced Web services discovery engine to find Web services from both UDDI registries and Web services Inspection Language (WSIL) documents and then create a qualified service list. Then a service selection problem is mapped into a solution space {0,1} for use by an optimization algorithm that performs second level service selection of the best set of services based on the requirements.

23 Claims, 13 Drawing Sheets

| Title barbpol.xml | | | | | | | |
|---|---|---|---|---|---|---|---|
| File Edit Analyze Search Help | | | | | | | |
| BPOL Ty | Get Business Solution... | | | | | | |
| Preferenc | Configure... 1110 | 2 | Col 3 | Col 4 | Col 5 | Col 6 | Col 7 |
| Preferenc | Generate WSFL... | tch Ticket\|Sh... | 1 | 2 | 3 | 4 | Travel\| |
| Preferenc | | nsport Ticket\| | 1 | 2 | 3 | 4 | News Collection\| |
| Preference | Hotel | ell\| | 1 | 2 | 3 | 4 | News Collection\| |
| Preference | Shopping | Pickup\| | 1 | 2 | 3 | 4 | Match\| |
| Preference | News Collection | Pickup\| | 1 | 2 | 3 | 4 | Food\| |
| Preference | Pickup | Pickup\| | 1 | 2 | 3 | 4 | Match Ticket\| |
| Preference | Travel | Travel\|Food\|Mat... | 1 | 2 | 3 | 4 | Match Ticket\| |
| Preference | Food | End\| | 1 | 2 | 3 | 4 | Hotel\| |
| Preference | Match | End\| | 1 | 2 | 3 | 4 | News Collection\| |
| Preference | End | End\| | 1 | 2 | 3 | 4 | Travel\| |
| | | | 0 | 0 | 0 | 0 | 0 |

*Figure 11*

SYSTEM AND METHOD OF DYNAMIC SERVICE COMPOSITION FOR BUSINESS PROCESS OUTSOURCING

BACKGROUND OF THE INVENTION

1. Field of the Invention

The present invention generally relates to systems for business process outsourcing and more particularly to performing optimal business process composition using existing Web services to match business requirements.

2. Background Description

Business processes describe the procedures and rules a business entity must follow to meet its objectives. They specify the steps, tasks, and choreography needed to achieve a goal, place constraints on activities, and identify resources needed between a service requester and a service provider. A business process may include services that are local to the business's domain, or span across enterprise boundaries. Interactions between two or more parties may be composed of simple message exchanges, or can involve long running interactions requiring detailed process management.

Traditionally, a business analyst composes a business process by examining established business scenarios and producing a composition where predefined processes are typically integrated with a fixed set of back-end applications. Such process compositions are time-consuming. In addition, they are inadequate in a dynamic business environment as they do not account for variation, and they are often difficult to change. To stay competitive, companies must be agile in adapting their business processes to ever-changing market dynamics. There is an increasing need to create new or update existing business processes in an easier and more efficient way, tailored to business dynamics while facilitating integration with service providers.

The introduction of Web services paves the way for easier business process integration. (See Ron Schmelzer et al, *XML and Web Services Unleashed*, SAMS Publishing, 2002.) Web services are Internet-based modular, self-contained applications that encapsulate business functions. Using common and agreed standards, Web services are described and published in a common Universal Description Discovery and Integration (UDDI) directory, which can be dynamically discovered and invoked. Web services are not necessarily new applications; they are often wrappers for legacy applications to make them network accessible. Web services are most suitable in providing encapsulated business functions used as building blocks, enabling integration of business processes and applications.

Increasingly, Web services are being used to integrate heterogeneous applications in a distributed environment. Because Web services identify and connect to one another in a standard way, it is feasible to compose a set of existing Web services to form a business process, thus reducing the complexities of creating new business processes. Web services may also be used to implement business processes through the selection and binding of Web services to business process tasks.

To standardize the specification of business processes, several business process languages have been created. These languages embrace the utilization of Web services, in their functional ability to define processes, partners, task execution choreography, and fault handling. Examples of such languages are XLANG and Web Services Flow Language (WSFL), which have been superceded by Business Process Execution Language for Web Services (BPEL4WS). Additional languages include Web Service Choreography Interface and others jointly defined by major e-business companies (see *E-business Process Modeling: The Next Big Step*, Selim Aissi, Pallavi Malu, and Krishnamurthy Srinivasan, IEEE Computer, Vol. 35, No. 5, May 2002, pp. 55–62). With such business process languages, Web services provided by any intra-enterprise (e.g. an organizational department) or inter-enterprise entities (e.g. trading partners) can all cooperatively integrate and perform in a business process in a standard way.

Integration of Web services and business processes fosters collaboration with heterogeneous service providers and opens the door for new business opportunities. A major benefit of using Web services in adaptive business processes is their ability to be dynamically composed and to meet changing business requirements. Companies offering new business processes composed with Web services are responsive to new or changed market requirements, resulting in an effective way to control costs, improve profits, and create a competitive edge.

One of the key challenges of composing adaptive business processes is to select services that meet business needs. With Web services, any number of business services are published in a UDDI registry and located dynamically, thus increasing the choices of service providers and the complexity of the provider selection process. In this paradigm, a manual way of composing business process and service provider selection though a graphic user interface is unsuitable in a complex business scenario. Instead, an automated means of business process composition is required.

An important aspect when composing a new or updating an old business process is to meet the new and evolving business requirements. Unfortunately, current Web services based business process execution languages do not adequately accommodate detailed requirement specification, making it difficult to generate optimal business process compositions. In this aspect, there are several issues. First, business requirements and preferences tend to be informal, subjective, and difficult to quantify. The challenge in automating the business process composition is to properly formulate the descriptive and subjective requirements in quantifiable and objective specifications in machine-readable formats, suitable for automatic composition. Second, a single Web service is most likely inadequate to serve the customers' business needs; it takes a selection of various Web services composed together to form a business process. The challenge is to select the services that not only satisfy the individual requirements but also best fit the overall composed business process. Therefore, the entire business process needs to be optimized prior to execution.

A paper by B. Benatallah, et al., "Towards Patterns of Web Services Composition" (University of New South Wales, UNSW-CSE-TR-0111; ftp://ftp.cse.unsw.edu.au/pub/doc/papers/UNSW/0111.ps.Z, November 2001) presents patterns for bilateral service-based interactions, multilateral service composition, and execution of composite services both in a centralized and in a fully distributed environment. But it lacks the customers' requirements representation and efficient search mechanism to perform dynamic service composition. A paper by Shankar R. Ponnekanti, Armando Fox, "SWORD: A Developer Toolkit for Building Composite Web Services" (Stanford University, 2002) addresses a particular subset of automatic or semi-automatic composition of existing Web services. The toolkit, SWORD, is a set of tools for the composition of a class of Web services including "information-providing" services. It focuses on information integration using its own service model rather than the discovery based dynamic Web services composition.

The Service Community proposed in Boualem Benatallah et al., "Declarative Composition and Peer-to-Peer Provisioning of Dynamic Web Services" (IEEE ICDE 2002), herafter "Benattalah 2002", defines a set of interfaces to enforce service providers to implement the full or partial interface. Our concept of Web services cluster refers to a set of services that perform a specific task. It is task-oriented concept, which may have the same service interface or different service interface. Further, there are no requirements used in Benatallah 2002 during the composition process. Therefore, the constructed business process may not the optimal one. A fuzzy querying technology is used to perform video server selection (see Patrick Bosc, Ernesto Damiani, Mariagrazia Fugini, "Fuzzy Service Selection" in 25 *A Distributed Object-Oriented Environment*, IEEE Transactions on Fuzzy Systems, vol. 9, No. 5, October 2001, pp. 682–698). It is not a generic Web services selection solution for business process composition.

In this disclosure, an "individual Web Service" refers to a simple Web Service described in a WSDL whereas a "composite Web Service" refers to as a set of Web services that are described in a Web service execution language, such as defined by major e-business companies, i.e. Business Process Execution Language for Web Services (BPEL), WSFL and XLANG.

Again, the challenging issues of dynamically configuring a new business process using existing Web services are as follows:

Lack uniform representation to capture business requirements, preferences; Web services features, event-action mapping as well as the relationships among Web services.

Lack an automated mechanism to generate search script to dynamically discover appropriate Web services for performing a specific task from UDDI registries populated with Web services records.

Lack seamless integration mechanism for template based business process flow composition and event-driven business process flow composition Lack effective service selection mechanism to automatically construct an optimal business process using available Web services.

Lack efficient tooling to support dynamic adaptation of Web services flow to different modeling languages (e.g. BPEL, WSFL, FDML).

SUMMARY OF THE INVENTION

It is therefore an object of the present invention to provide an automated mechanism to generate search scripts dynamically to find appropriate Web services for performing a specific task from UDDI registries or a WSIL document.

Another object of the invention is to provide a seamless integration mechanism for template based business process flow composition and event-driven business process flow composition, where abstract services specified by the requirements are generated and put in a template for further binding to real Web services.

A further object of the invention is to provide service selection mechanisms to automatically construct an optimal business process using available Web services.

It is also an object of the invention to provide efficient tooling to support dynamic adaptation of Web services flow to different modeling languages (e.g. WSFL, FDML or BPEL4WS).

Web Service Outsourcing Manager (WSOM) framework presented in this disclosure attempts to provide solutions to the above challenges. In short, WSOM enables customers to dynamically configure new business processes based on incoming requirements and solution expertise captured by the system.

The Business Process Outsourcing Language (BPOL) of the present invention is a solution to capture the business requirements. More specifically, a Business Process Outsourcing Language (BPOL) provides a new format in which a plurality of requirements including process execution flow rules (such as parallel or sequential), preferences, business rules and event-action mappings as well as related links can be captured and to dynamically construct search script for an advanced Web services discovery engine to find Web services from both UDDI registries and Web services Inspection Language (WSIL) documents and then create an narrow-downed list of available services. Then the invention proposes a novel mechanism to map a service selection problem into a solution space $\{0,1\}$. This mechanism utilizes an optimization algorithm for performing the second level service selection, which refers to constructing the optimal business process by selecting the best set of services based on the requirements.

Generating business process on demand fulfills a higher-level requirement of e-business on demand. In this disclosure, we propose a Service Outsourcing Manager to fulfill this requirement. It enables customers to dynamically configure a new business process based on incoming requirements and precious solution expertise. Also it can be used by the internal applications to build a new value added services using the existing services, such as hosted by a trading hubs.

In this disclosure, a mathematical model is used for dynamic business processes configuration using Web services to match business requirements. The requirements are analyzed and optimized to generate Business Process Outsourcing Language (BPOL) documents, a proposed XML representation to annotate business requirements to be able to dynamically compose business processes. Based on BPOL, two-level service selection/optimization mechanism is proposed to configure a new business process based on business requirements. The first-level service selection mechanism is achieved by using the Advanced Web services Discovery Engine, Business Explorer for Web Services (BE4WS) using the search criteria generated automatically by one of the components, the BPOL processor, to narrow down the list of qualified services. The second-level service selection mechanism is computed by a global optimization algorithm, Genetic Algorithm, to perform the capability matching and then construct the best business process that satisfies the business requirements defined in BPOL.

A research prototype is implemented to provide the embodiment of this framework, and the prototype provides two mechanisms to capture the business requirements from the customers, namely, a Graphical User Interface (GUI) based BPOL Analyzer and program based BPOL converter. The WSOM provides a regular Java package and Web services Interface for integration. One example scenario is built on WebSphere Studio Workbench, an Eclipse tooling platform. So the WSOM can be installed as a new perspective for Eclipse tools to dynamically construct a new business process using existing Web services based on business requirements.

BRIEF DESCRIPTION OF THE DRAWINGS

The foregoing and other objects, aspects and advantages will be better understood from the following detailed description of a preferred embodiment of the invention with reference to the drawings, in which:

FIG. 11 is a screen shot showing a wizard to automate WSFL sketch generation.

DETAILED DESCRIPTION OF A PREFERRED EMBODIMENT OF THE INVENTION

This disclosure is organized as follows: First, there is described the Business Process Outsourcing Language (BPOL) that represents the business requirements and preferences, followed by the architecture of the Web Service Outsourcing Manager, Business Process outsourcing model, and the major components; next, Automatic Generation of Web service Execution Language is discussed, followed by the global optimization algorithm—Genetic Algorithm—adapted for WSOM. Last, a case study is presented with the framework embodiment of a prototype implementation.

1 Business Process Outsourcing Language (BPOL)

An XML representation of the BPOL may be used to capture the flow rules as well as business requirements and preferences to guide service discovery and selection. The BPOL defines business requirements including service flow rules, customer preferences and business rules. In WSOM, BPOL is the core input of Business Process Composer. BPOL can be generated by the Requirement Analyzer.

There are two major parts in BPOL, i.e. the flow rules, business requirements. Flow rules include parallel services and sequential services expected by customer. The WSOM retrieves all the possibilities of parallels and sequences from customers' expected business processes. Such information is used later to gain the final services for customers. BPOL captures the business requirements. Values that can be used to evaluate specific services are recorded in BPOL. In addition, business rules are also recorded in BPOL.

Figure 1:
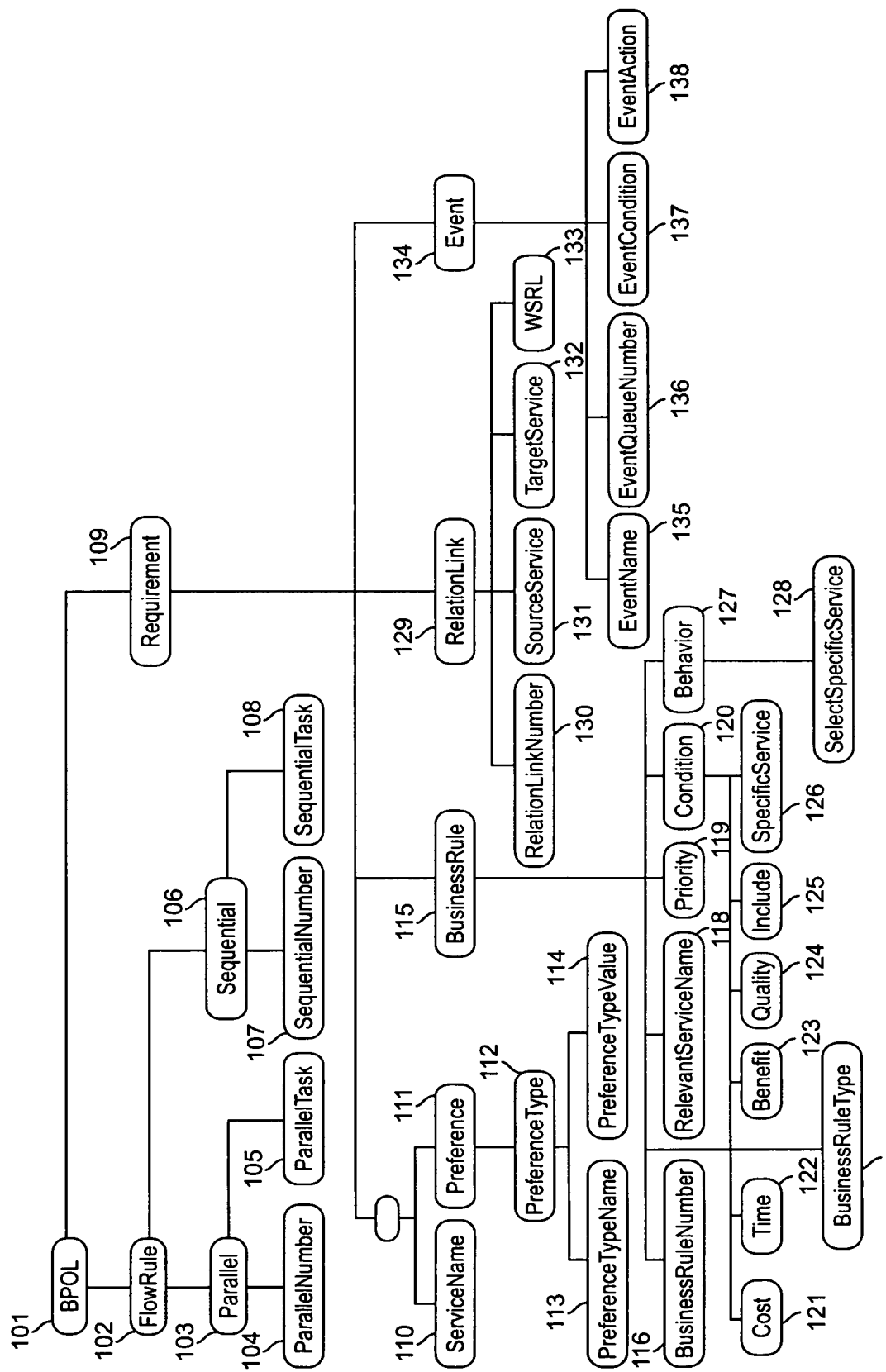
FIG. 1 is a diagram showing the structure of the Business Process Outsourcing Language (BPOL) of the invention.

As illustrated in FIG. 1, the major elements of this annotation are described as follows: service name 110, preference 111, business rules 115 binding, service relationship (RelationLink 129), and event 134 (for binding as well). Preferences include name and value pairs, such as the preferred UDDI registry location to search. Business rules 115 govern the selection of a Web service and optimal business process; they include cost 121, time 122, benefit 123 (service bonus), quality of service 124, and specific service 126 (preferred services). Service relationships describe the business relationships between service providers, such as if service A is selected together with service B, the combined cost is less than if they are not selected together, thus affecting an overall optimal business process composition. A Web service may include multiple operations that conform to a certain invocation sequencing rule. A binding event associated with these operations in a Web service triggers an event action 138 to be performed for evaluating the service selection.

Again, in the form of XML, the major BPOL elements are described as follows:

<FlowRule> 102, one of the two major parts of BPOL;
<Requirement> 109, one of the two major parts of BPOL;
<Parallel> 103, the parallel of expected services;
<Sequential> 106, the sequence of expected services;
<Preference> 111, the preference of customers;
<BusinessRule> 115, the constraints of customers request;
<Condition> 120, the condition of a business rule;
<Behavior> 127, the action under the particular conditions;
<RelationLink> 129, the relationships between two particular expected services.
<Event> 134, the event list includes some event-action mappings.

The structure of the BPOL is shown in DTD (Document Type Definition) form in List 1, below, where the item numbers correspond to the visual presentation of this structure in FIG. 1.

List 1. BOPL's DTD

```
<!ELEMENT BPOL (FlowRule*, Requirement*)> (item 101)
<!ELEMENT FlowRule (Parallel*, Sequential*)> (item 102)
<!ELEMENT Parallel (ParallelNumber, ParallelTask*)> (item 103)
<!ELEMENT ParallelNumber (#PCDATA)> (item 104)
<!ELEMENT ParallelTask (#PCDATA)> (item 105)
<!ELEMENT Sequential (SequentialNumber, SequentialTask*)> (item 106)
<!ELEMENT SequentialNumber (#PCDATA)> (item 107)
<!ELEMENT SequentialTask (#PCDATA)> (item 108)
<!ELEMENT Requirement ((ServiceName, Preference)*, BusinessRule*, RelationLink*, Event*)> (item 109)
<!ELEMENT ServiceName (#PCDATA)> (item 110)
<!ELEMENT Preference (PreferenceType*)> (item 111)
<!ELEMENT PreferenceType (PreferenceTypeName, PreferenceTypeValue)> (item 112)
<!ELEMENT PreferenceTypeName (#PCDATA)> (item 113)
<!ELEMENT PreferenceTypeValue (#PCDATA)> (item 114)
<!ELEMENT BusinessRule (BusinessRuleNumber, BusinessRuleType, RelevantServiceName, Priority, Condition, Behavior)> (item 115)
<!ELEMENT BusinessRuleNumber (#PCDATA)> (item 116)
```

```
<!ELEMENT BusinessRuleType (#PCDATA)> (item 117)
<!ELEMENT RelevantServiceName (#PCDATA)> (item 118)
<!ELEMENT Priority (#PCDATA)> (item 119)
<!ELEMENT Condition (Cost*, Time*, Benefit*, Quality*, Include*, SpecificService*)> (item 120)
<!ELEMENT Cost (#PCDATA)> (item 121)
<!ELEMENT Time (#PCDATA)> (item 122)
<!ELEMENT Benefit (#PCDATA)> (item 123)
<!ELEMENT Quality (#PCDATA)> (item 124)
<!ELEMENT Include (#PCDATA)> (item 125)
<!ELEMENT SpecificService (#PCDATA)> (item 126)
<!ELEMENT Behavior (SelectSpecificService)> (item 127)
<!ELEMENT SelectSpecificService (#PCDATA)> (item 128)
<!ELEMENT RelationLink (RelationLinkNumber, SourceService, TargetService, WSRL)> (item 129)
<!ELEMENT RelationLinkNumber (#PCDATA)> (item 130)
<!ELEMENT SourceService (#PCDATA)> (item 131)
<!ELEMENT TargetService (#PCDATA)> (item 132)
<!ELEMENT WSRL (#PCDATA)> (item 133)
<!ELEMENT Event (EventName, EventQueueNumber, EventCondition, EventBehavior)> (item 134)
<!ELEMENT EventName (#PCDATA)> (item 135)
<!ELEMENT EventQueueNumber (#PCDATA)> (item 136)
<!ELEMENT EventCondition (#PCDATA)> (item 137)
<!ELEMENT EventAction (#PCDATA)> (item 138)
```

There are two types of business rules, namely, derivation rules and event rules. The latter is event-condition-action (ECA) or triggers in a control system. Business rules specify how the various steps of a business process can be encoded in the form of reaction rules. The event list is used to capture the event-condition-action (ECA) mapping for event driven business process composition.

In addition, the extensible BPOL structure can allow the existing XML files can be imported. For example, if FlowXML file, BusinessRlueXML file, PreferenceXML file, ECA-XML files can be used to represent business flow, business rules, preferences, Event-action mappings respectively as a standard way, then they can be easily imported into BPOL. However, BPOL is not a simple container of these existing XML formats. It will carry the annotation information among the objects listed in different XML files. One example annotation is WSRL we used in this disclosure.

Turning now to List 2 there is shown a partial BPOL for an exemplar enterprise, a basketball fan's business requirements for purchasing tickets, planning a trip, etc.

List 2

A sample Business Requirement Described in BPOL for a basketball Fan.

```
<?xml version="1.0"?>
<!DOCTYPE BPOL SYSTEM "BPOL.dtd">
<BPOL>
  <FlowRule>
    <Parallel>
      <ParallelNumber>0</ParallelNumber>
      <ParallelTask>Match</ParallelTask>
      <ParallelTask>Food</ParallelTask>
      <ParallelTask>Travel</ParallelTask>
    </Parallel>
    ......
```

-continued

```
    <Sequential>
      <SequentialNumber>8</SequentialNumber>
      <SequentialTask>Start</SequentialTask>
      <SequentialTask>News Collection</SequentialTask>
      <SequentialTask>Pickup</SequentialTask>
      <SequentialTask>Match</SequentialTask>
      <SequentialTask>End</SequentialTask>
    </Sequential>
  </FlowRule>
  ......
  <Requirement>
    <ServiceName>Match Ticket</ServiceName>
    <Preference>
      <PreferenceType>
        <PreferenceTypeName>Cost</PreferenceTypeName>
        <PreferenceTypeValue>300</PreferenceTypeValue>
      </PreferenceType>
      <PreferenceType>
        <PreferenceTypeName>Time</PreferenceTypeName>
        <PreferenceTypeValue>10</PreferenceTypeValue>
      </PreferenceType>
      <PreferenceType>
        <PreferenceTypeName>Benefit</PreferenceTypeName>
        <PreferenceTypeValue>30</PreferenceTypeValue>
      </PreferenceType>
      <PreferenceType>
        <PreferenceTypeName>Quality</PreferenceTypeName>
        <PreferenceTypeValue>0.95</PreferenceTypeValue>
      </PreferenceType>
      <PreferenceType>
        <PreferenceTypeName>Included</PreferenceTypeName>
        <PreferenceTypeValue>Food</PreferenceTypeValue>
      </PreferenceType>
    </Preference>
  ......
  <BusinessRule>
    <BusinessRuleNumber>0</BusinessRuleNumber>
    <BusinessRuleType>Condition-Service</BusinessRuleType>
    <RelevantServiceName>Transport</RelevantServiceName>
    <Priority>3</Priority>
    <Condition>
      <Cost>20</Cost>
    </Condition>
    <Behavior>
      <SelectSpecificService>Train</SelectSpecificService>
    </Behavior>
  </BusinessRule>
  ......
  <RelationLink>
    <RelationLinkNumber>0</RelationLinkNumber>
    <SourceService>Transport Ticket</SourceService>
    <TargetService>Pickup</TargetService>
    <WSRL>http://www.myCo.com/wsrl/TP.wsrl</WSRL>
  </RelationLink>
  </Requirement>
  ......
  <Event>
    <EventName>Exception</EventName>
    <EventQueueNumber>1</EventQueueNumber>
    <EventCondition>Quantity>=0</EventCondition>
    <EventBehavior>BackOrder</EventBehavior>
  </Event>
</BPOL>
```

Vocabularies for requirements, services and registries are important to ensure clear understandings among customers, service providers and services registries. There are two approaches to capture business requirements. One is through the GUI interfaces. Another is to convert other requirements documents into BPOL. When inputting requirements using a GUI, users are less likely to select wrong terms to describe their preferences since there is a set of pre-defined vocabulary terms, and a user just needs to pick the ones that match what he or she wants to describe. But when converting other requirements to BPOL, different creators may use different vocabulary terms. Moreover, it is necessary that there are BPOL exchanges among different systems. In that way, having a unique and standard vocabulary library is critical to avoid misunderstanding business requirements.

A standard vocabulary library facilitates systems to collect business requirements, search useful services from the registries, and obtain the optimum business processes for customers. But in fact, it is difficult to constrain every customer or every service provider to select uniform terminology to define their requirements or services. So two solutions are put forward: 1) building a vocabulary library, and 2) adding new terms to the vocabulary. In the predefined vocabulary library, participants in a business process can select the correct term to represent their meanings. For example, to express the meaning of "Cost", different people may use different terms, such as "Price", "Charge" and "Fee". But if they are using a GUI with a predefined vocabulary of terms, they are limited to the term "Cost." If the term "Cost" does not have the meaning they want, they need to define another term. This is the second solution. For example, if the term "Cost" in the standard vocabulary does not include the meaning of "Tax", participants can define a new term, "CostPlusTax" to express their exact meaning. Standard rules must be used to define new terms in order that those new terms can be machine-understandable and processed correctly.

According to current available services and requirement descriptions, it is possible to summarize all the terms used frequently by customers and providers. Based on those common terms, a vocabulary library can be built. Any participants, customers and providers, are able to define new terms. But the precondition is that all of them need to conform to the unique rules. The WSOM can detect duplication and anomaly where a newly defined term already exists in the library or disobeys the rules for constructing terms. If the proposed terms already exist in the vocabulary stored in the library, they cannot be accepted again. If the proposed terms no not already exit in the library, they can be added to the library and used by all participants. Thus, the vocabulary library becomes a standard for future providers and customers, who can follow the standard to define their services and requirements. The vocabulary library ought to be easily accessible to all the participants. When a customer defines his or her requirements, he or she must be clear about all the meanings of each term used in defining the requirements. A service provider must make sure the descriptions of his service use the vocabulary terms in the library. It is possible that different service providers may use the same terms but that these terms express different meanings because of misunderstandings. This ambiguity must be avoided to ensure the correctness of the final business process.

In addition, customers and providers may not want to use certain existing vocabularies of same meaning in the library but prefer to add their own ones, which can be easily incorporated into the library as synonyms. Once new vocabularies are added into the vocabulary library, they become standards for future use.

Currently, there are some vocabularies in the vocabulary library:

Cost represents how much customers need to pay for their businesses;

Time—how long it will take customers to finish their businesses;

Bonus—how much would the cost be reduced if customers select a particular service;

Quality—quality of service;

Binding—additional services that might be provided if a particular service is selected by customers.

Basic information of Web services is described in WSDL. An important part of the data about Web services is the relationships among business entities, business services and operations, which are keys to composing and executing dynamic business processes. However, the current Web services specifications and UDDI specification lack in the definitions and descriptions of such relationships. WSRL, as described in Liang-Jie Zhang, Henry Chang, Tian Chao, *Web Services Relationships Binding for Dynamic e-Business Integration*, International Conference on Internet Computing (IC'02), Las Vegas, May 24–27, 2002, captures the Web services relationships at different granularities: business-business relationship (BBR), business-service relationship (BSR), service-service relationship (SSR), business-operation relationship (BOR), service-operation relationship (SOR), operation-operation relationship (OOR). These relationships facilitate selecting and composing a set of services that meets the business requirements. In the BPOL specification described hereafter, the WSRL is the input of the BPOL composer. The WSRL can be embedded into it via a link tag.

Exploring appropriate business applications (Web services) published in the UDDI registry is a critical issue. Search for such applications should be effective in terms of time and uniform in terms of interfaces. An XML based UDDI exploration engine, Business Explorer for Web services (BE4WS), provides developers with standard interfaces for efficiently searching business and service information in one or more UDDI registries, and it is part of the IBM Web services Toolkit (WSTK). The engine is based on the proposed XML-based search script, UDDI Search Markup Language (USML), to represent a search request including multiple queries, key words, UDDI sources, and aggregation operators. BE4WS processes the USML request and performs advanced UDDI registry exploration and aggregates search results from different UDDI registries.

Figure 2:
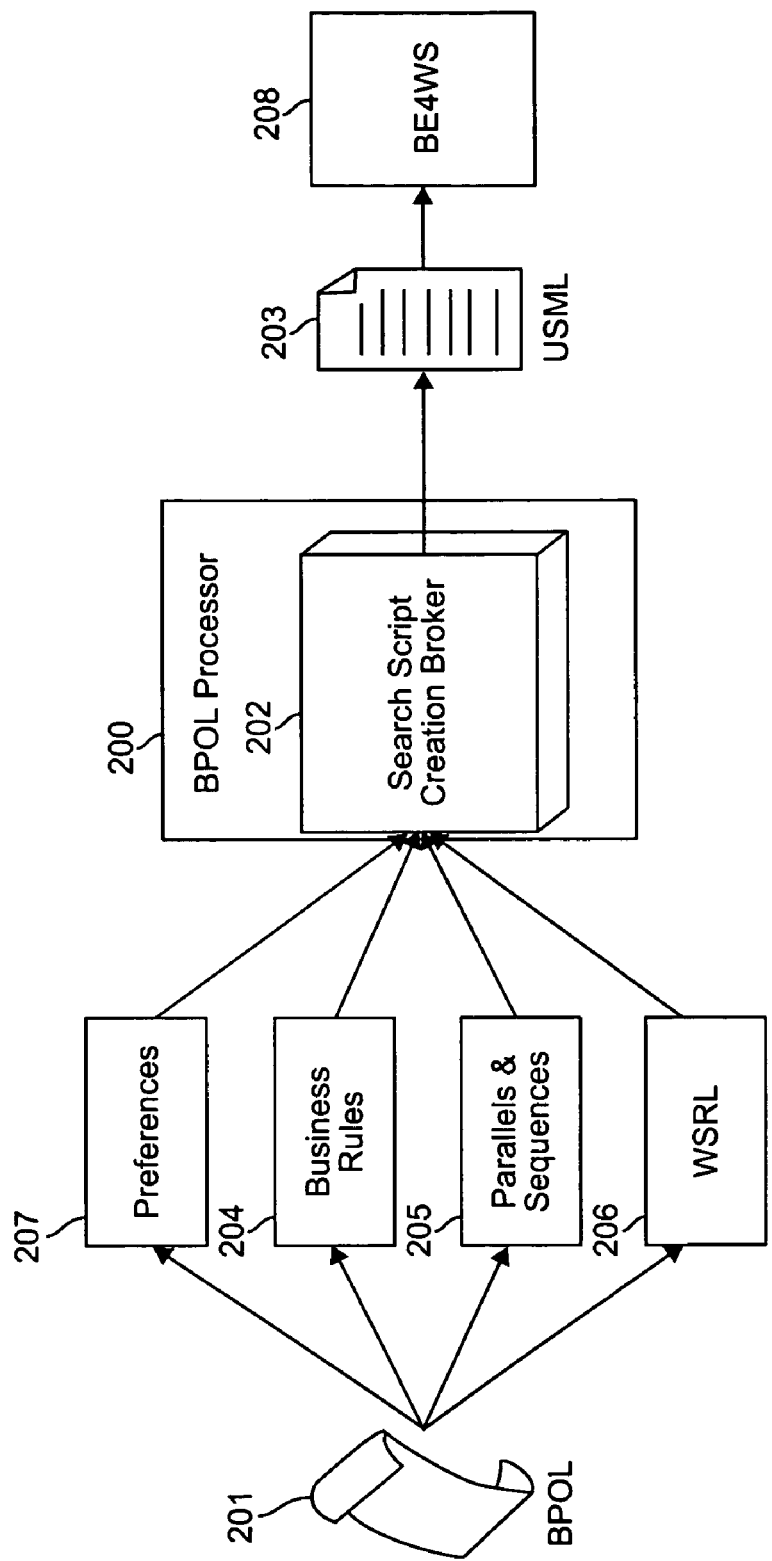
FIG. 2 is a UDDI Search Markup Language (USML) Generation Diagram.

Turning now to FIG. 2, a USML Generation Diagram, there is shown how a Search Script Creation Broker 202 in BPOL Processor 200 is developed to automatically construct a USML script 203 based on BPOL 201 for forwarding to the advanced Web services discovery engine (BE4WS 208). The aggregated service list is presented to the Business Process Composer, as further described in reference to FIG. 3.

In BPOL, business requirements are grouped together. It is an appropriate part of USML because multiple search queries come from business needs and preferences 207. The relationships between search queries can be also obtained from the Parallels and Sequences 205 among Web Service clusters and WSRLs 206, referenced via a Uniform Resource Identifier (URI) in BPOL 201. Business rules 204 in BPOL 201 can help the broker 202 generate more precise USML 203 to retrieve qualified Web services. List 3 shows an example of a BPOL, which gets translated into USML in List 4.

List 3. Sample BPOL

```
<?xml version="1.0"?>
<!DOCTYPE BPOL SYSTEM "BPOL.dtd" >
<BPOL>
    <FlowRule>
        <Parallel>
            <ParallelNumber>0</ParallelNumber>
            <ParallelTask>Match</ParallelTask>
            <ParallelTask>Food</ParallelTask>
        </Parallel>
......
        <Sequential>
            <SequentialNumber>5</SequentialNumber>
            <SequentialTask>Start</SequentialTask>
            <SequentialTask>News Collection</SequentialTask>
            <SequentialTask>Food</SequentialTask>
            <SequentialTask>End</SequentialTask>
        </Sequential>
......
    </FlowRule>
......
</BPOL>
```

Based on the flow rules in the BPOL, categories derived from the task names, in conjunction with preference files, are used for generating search scripts. For example in List 4, a task of "Food" with preference of "sit-down dinner" will map into the NAICS category of "Full-Service Restaurants" or 72211; a task of "Match" will map to the NAICS category of "Spectator Sports" or 71121; a task of News Collection will map to the NAICS category of "telecommunications" or 5133. In addition, the preference file also indicates which UDDI registry locations to search for the Web services, i.e. private eMarket A located at a particular URL (e.g. http://wsbi10/services/uddi/inquiryAPI,) or public UDDI registry located at another URL (e.g. http://wsbi05/services/uddi/inquiryAPI.). USML search script as listed in List 4, below, is generated based on the requirements in List 3.

List 4

Sample USML scripts generated based on the BPOL in List 3 This USML script will aggregate results via aggregation operator OR from all three searches, with each denoted with the pair of <Search> and </Search> tags, and return the results to caller at the same time

```
<?xml version="1.0"?>
<!DOCTYPE Search SYSTEM "UDDISearch.dtd">
<Search>
    <ProcessID>0001</ProcessID>
    <Query>
        <Source>Private UDDI</Source>
        <SourceURL>http://wsbi10/services/uddi/inquiryAPI</SourceURL>
        <BusinessName>%</BusinessName>
        <Category type="NAICS">71121</Category>
        <FindBy>Business</FindBy>
    </Query>
    <Query>
        <Source>Public UDDI</Source>
        <SourceURL>http://wsbi05/services/uddi/inquiryAPI</SourceURL>
        <BusinessName>%</BusinessName>
        <Category type="NAICS">72211</Category>
        <FindBy>Business</FindBy>
    </Query>
```

-continued

```
    <Query>
        <Source>Public UDDI</Source>
        <SourceURL>http://wsbi04/services/uddi/inquiryAPI</SourceURL>
        <BusinessName>%</BusinessName>
        <Category type="NAICS">5133</Category>
        <FindBy>Business</FindBy>
    </Query>
    <AggOperation>OR</AggOperation>
</Search>
```

2. WSOM Architecture

Figure 3:
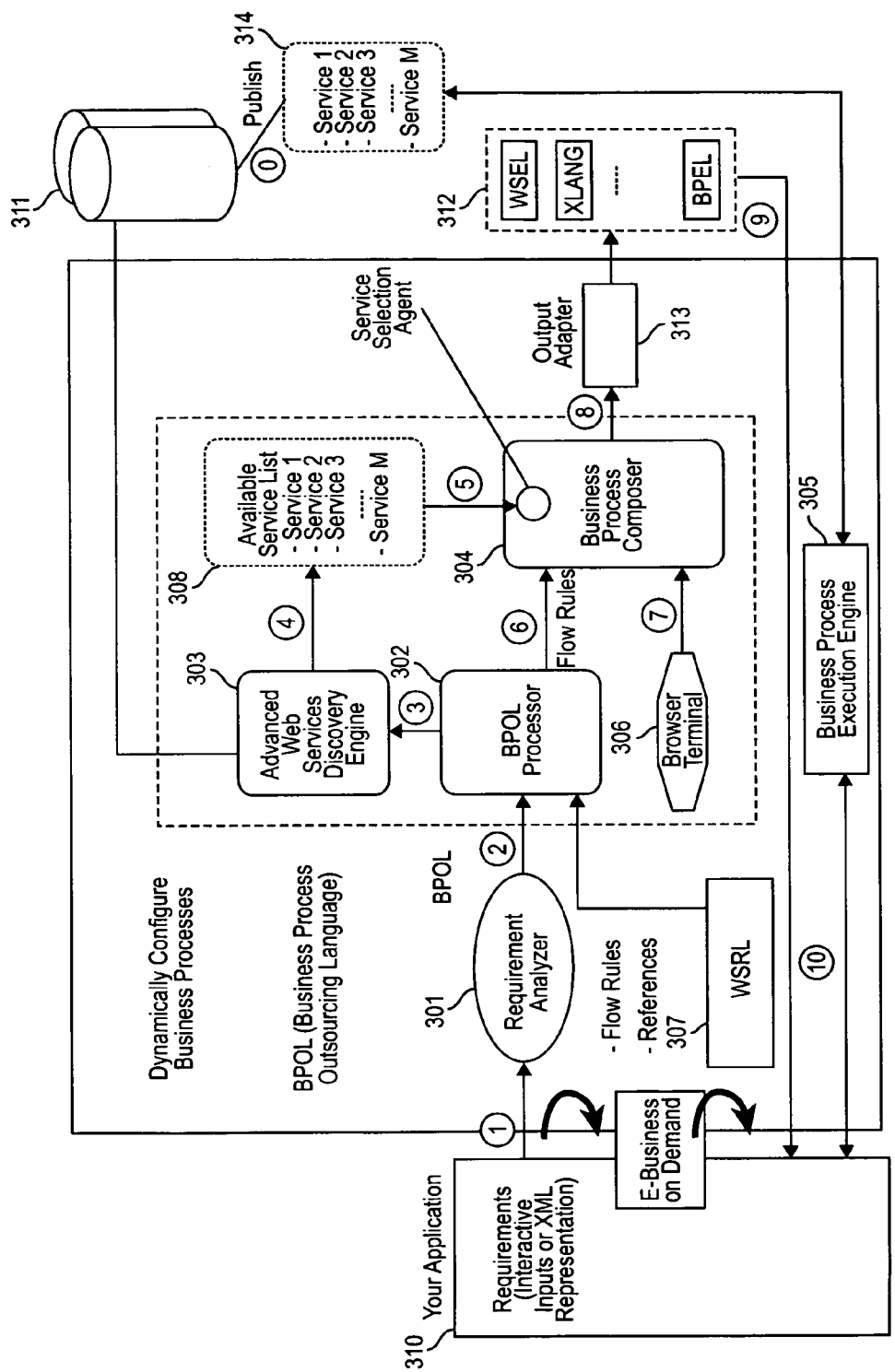
FIG. 3 is a diagram showing the architecture of the Web Service Outsourcing Manager (WSOM) framework.

The architecture of the Web Service Outsourcing Manager (WSOM) framework is shown in FIG. 3. The WSOM comprises the following six components:

1) Requirement Analyzer 301 analyzes the incoming requirements 310 and generates the BPOL;
2) BPOL Processor 302 processes the BPOL to generate a search script (e.g. USML) for the advanced Web Service discovery engine 303 and guide the business process composer 304 for service selection;
3) The advanced Web services discovery engine 303 finds qualified Web services;
4) Business Process Composer 304 optimizes the service selection;
5) Web Service Invoker 305 invokes Web services automatically to get the capability of a Web Service, and
6) GUI Admin Console 306 for Business Process Composition that enables human decision makers to interactively monitor and make changes to the composed business process.

The intermediate output of WSOM is BPOL with the one of the potential final output being Web Services Flow Language (WSFL) 307 which describes the process execution of Web services. The WSOM uses WSRL 307 content and BPOL to automatically create a search script (e.g. USML), which guides the advanced Web services discovery engine 303 (e.g. BE4WS) to narrow down the related search results and dynamically configure a business process using the resulting available service list 308.

That is, the WSOM is a two-level service selection mechanism for narrowing down the desired services. The first level is achieved by using the advanced Web services discovery mechanism with business requirement annotation in BPOL as inputs to automatically generate XML-based search script for Web services look-up. The second level is achieved by using business requirements as well as the optimization algorithm to select the best suitable Web services and optimize the entire business process based on the business requirements.

The detailed steps involved may be described as follows with reference to FIG. 3:

Step 0. Web services are published to a centralized public UDDI registry 311 or multiple private UDDI registries for discovery Step 1. Customer sends out business requirements from the application 310 to the Requirement Analyzer 301

Step 2. Requirement Analyzer 301 creates BPOL based on the requirements

Step 3. BPOL processor 302 parses BPOL and automatically generates XML-based search script (e.g. USML) for the advanced Web services discovery engine 303.

Step 4. The Advanced discovery engine 303 conducts search process across multiple UDDI registries 311 or WS-Inspection documents based on the search criteria specified in the USML script created by BPOL Processor 302.

The aggregated result is a list of available services 308 that meet the search criteria.

Step 5. The available service list 308 is passed to Business Process Composer 304 for service composition.

Step 6. BPOL processor 302 uses WSRL 307 as input to extract the business flow rules from BPOL and pass the result to Business Process Composer 304.

Step 7. Decision makers can interact with Web Services Outsourcing Manager (not shown) via Web Browser or GUI 306 to tune the service selection and composition process.

Step 8. The result of Business Process Composer is formatted as a target Web service execution language such as BPEL or WSFL 312 defined for Web services via Output Adaptor 313.

Step 9. The resulted Web service execution language 312 from Output Adaptor 313 is returned to the application 310.

Step 10. When the application 310 wants to access and uses this newly composed Business Process, a business process execution engine 305 will dynamically invoke the respective Web services 314, which are part of the newly created business process.

3. Business Process Outsourcing Model

The goal of business process outsourcing is to configure a real business process using the services discovery and selection mechanism based on business requirements. The objectives of the proposed business process outsourcing model using Web services standards are to address each of the challenges discussed before, and the objectives are:

1) Capturing the business requirements using proposed Business Process Outsourcing Language (BPOL), an XML representation to record business requirements, preferences;
2) Generating search script for advanced Web services discovery to narrow down the service list based on BPOL;
3) Selecting the resulting available service list from 2) using optimization algorithm;
4) Creating the optimum business process via output adaptor;
5) Seamlessly integrating pre-defined business process flow composition and event-driven business process flow composition in one box.

A Web services cluster is an expected conceptual Web Service from a collection of all possible concrete Web services provided by one or multiple service providers for performing a specific task during a business process configuration. For example, shopping Web Service, shipping Web Service and credit checking Web services are different Web services clusters. In general, a Web services cluster is a conceptual Web Service, which is not referred to a real or concrete Web Service. Each Web services cluster will in the end be mapped to a real Web Service during the service selection and business process composition process.

Figure 4:
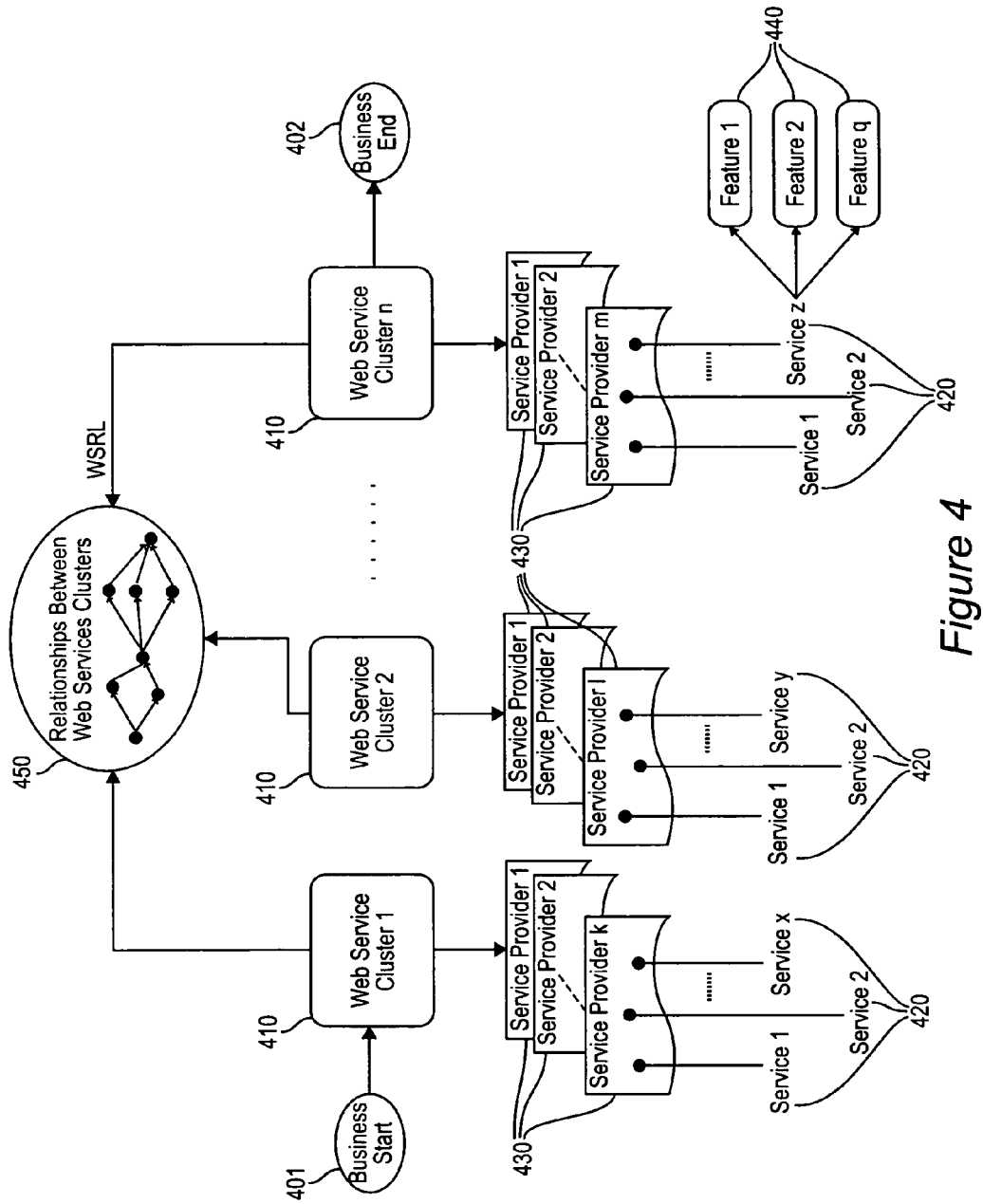
FIG. 4 is a flow diagram showing dynamic business process service composition.

A dynamic business process composition showing Web services clusters is illustrated in FIG. 4. This is a typical business process flow. It includes multiple Web services clusters 410 as well as a business start 401 and a business end 402. For each Web services cluster 410, there are multiple candidate services 420 provided by multiple service providers 430. Each Web Service has some features 440, if possible. As shown in FIG. 4, the first expected conceptual Web Service is Web services cluster 1; the second is Web services cluster 2; the n-th is Web services cluster n. The relationships 450 among these services are captured by Web services Relationships Language (WSRL), which provides additional criteria for selecting the right services and composing a business process for a customer specification.

3.1 Web services Outsourcing Definition

A collection of Web services is referred as a service set in this invention. A typical service set is shown as follows:

$$S_i = \{s_1, s_2, \ldots, s_{j(i)}\}, 1 \leq j(i) \leq N \quad (1)$$

where $S_i$ is represented as a service set, Service 1 as $S_1$, Service 2 as $S_2$, and Service N as $S_N$, etc. The services specified in one service set are to be configured to construct a new business process. Note that the sequence of the services and the relationships among services in the business process flow is defined in BPOL, Business Process Outsourcing Language, described in detail later. Note that it is usual that two identical services can be defined in the same service set. That is to say, two identical services can be used at different stages of a newly created business process. So it is recommended that all the identical services used at different stages should be put into one service set.

Theoretically, each business process can be constructed at minimum by one service. A typical business process comprising a set of services, service set, is represented as follows.

$$BP_i = h(S_i), 1 \leq i \leq M \quad (2)$$

Here, h represents the complicated construction schema defined in BPOL for configuring a business process based on service set $S_i$. If there are only N Web services in the service set, then the total number of the possible business processes M can be defined as the factorial of N, namely, M=N!. For example, if there are six Web services (N=6), a new business process can be constructed with 720 potential combinations (M=6!=720). In our model, the relationship and data connectivity between two sequential services are used to construct a new business process. The above representation just means that the business process is finally constructed by j(i) services. The number of j(i) shown in (1) depends on the business requirements such as preferences, flow rules and other requirements defined in BPOL.

For a specific service, e.g. $S_p$, only one choice will be made by the WSOM described in details later: either selected or deselected. Theoretically, each business process can be constructed by one service, two services or N services, shown as follows:

$$BP_i = h(\{s_1, s_2, \ldots, s_p\}), 1 \leq p \leq N, 1 \leq i \leq M \quad (3)$$

Where $S_p = \{0,1\}$, p=j(i).

For example, the i-th candidate business process is constructed by the following service set:

$$S_i = \{0,1,0,1,1\}, N=5 \quad (4)$$

where '1' denotes that the service is selected. That means, only service 2, service 4 and service 5 have been selected by the WSOM.

For each business process, the expected result is described as follows:

$$R^*_i = g(BP_i) = gg(S_i) \quad (5)$$

A functional relation $g(BP_i)$ or $gg(S_i)$ returns a measure of quality, or fitness, associated with the business process composition model.

The constructed business processes satisfying business requirements are shown as follows:

$$BP_{matched} = Best\{BP_1, BP_2, \ldots, BP_M\} \quad (6)$$

Where $BP_{matched}$ denotes the best business processes, comprising some of the matched services set.

So the service selection procedure is equivalent to picking up the appropriate services from the available service list which could be dynamically created by the advanced Web services discovery engine. Therefore, the service selection criterion is a key issue when configuring a new business process.

In this invention, a sample optimal business process construction criterion is defined as the one that most closely matches business requirements as measured by the total error function f, described as follows:

$$f(S) = \sum_{i=1}^{i=P} E_i = \sum_{i=1}^{P} \left[ \frac{1}{2}(R_i^d - R_i^*)^2 \right] \quad (7)$$

This cost function includes multiple variables. The number of the variables is determined by the business process flow template or the dynamic behaviors of the event-driven business process.

So the following equation represents minimizing the least squares fitting problem.

$$\min\{f(S)\} = \min\left\{\sum_{i=1}^{i=P} E_i\right\} = \min\left\{\sum_{i=1}^{i=P} \left[\frac{1}{2} w_i (R_i^d - R_i^*)^2\right]\right\} \quad (8)$$

Here $\forall S \in IB^N = \{0,1\}^N, 0 < f(S) < \infty, 0 \leq w_i \leq 1$ and $f(S) \neq const.$ where P is the number of business requirement indicators; wi represents the weight of the i-th business requirement indicator; $R_i^d$ is the target requirement indicator of the i-th requirement and $R^*_i$ represents the estimated value derived from the WSOM. The requirements are defined in BPOL described in detail later. Note that both $R_i^d$ and $R^*_i$ are normalized for evaluating the quality of the constructed business process. To normalize $R_i$, it is necessary to find a standard to evaluate each $R_i^d$. In general, we can find the largest $R_{max}$ from a particular Web services cluster and the particular $R_i$. Then, set $R_i^d = R_i/R_{max}$, i.e., the value of $R_i/R_{max}$ is the normalized requirement $R_i^d$. Another approach is to select customers' expected Re as the standard to normalize $R_i$. If $R_i^d$ is more than 1, it means that the service is not the appropriate one, then we enforce $R_i^d = 1$. If less than 1, the service is a possible candidate to fulfill business requirements. The example in the Section 6, below, uses the first approach to normalize $R_i$.

Figure 5:
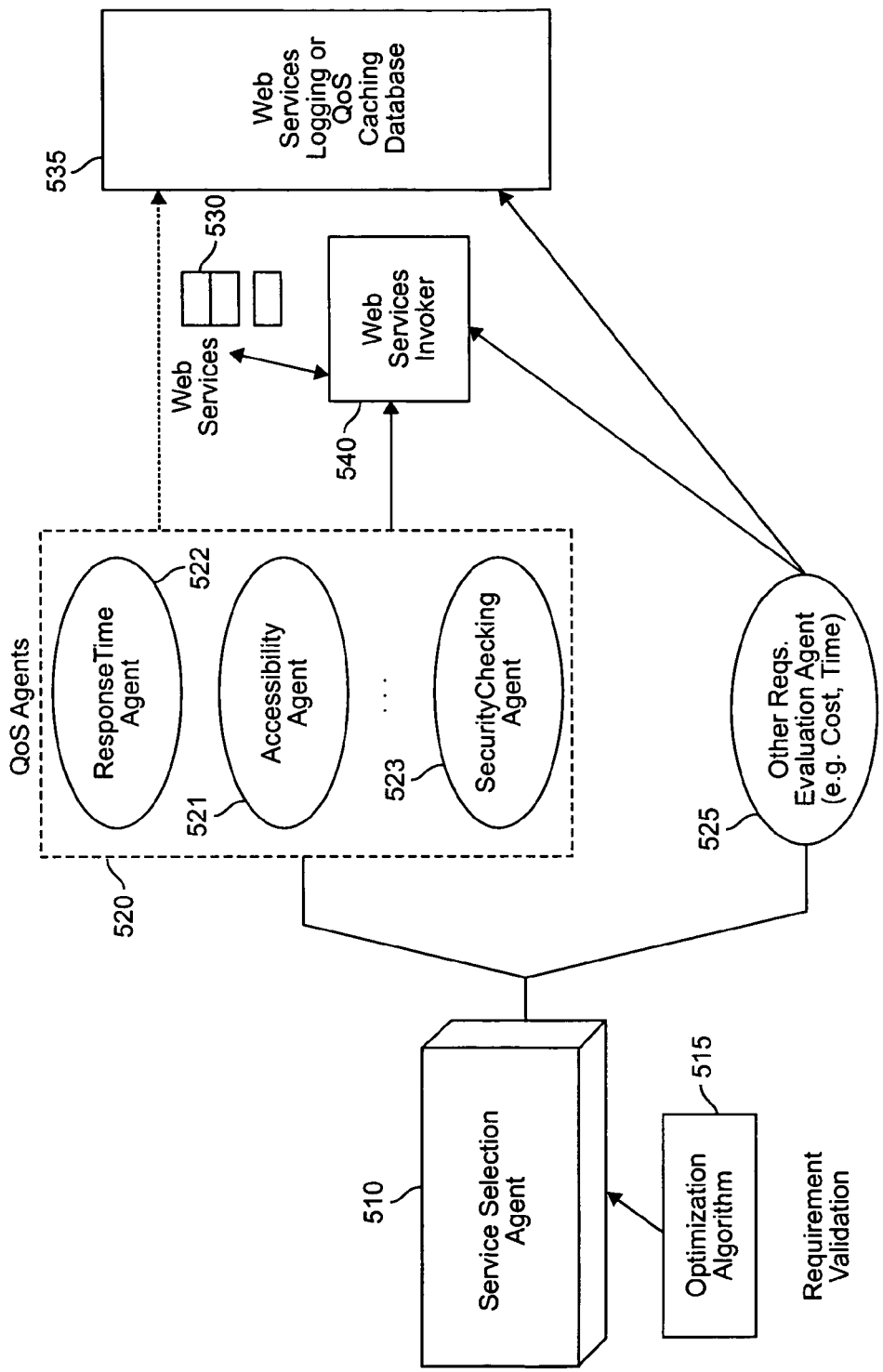
FIG. 5 is a diagram showing operation of the Service Selection Agent.

The requirements validation is an important aspect of the outsourcing, which comprises one or multiple indicators such as QoS (Quality), Cost, execution Time, and others. Typically, the execution time and cost are considered to be the quality indicators of a constructed business process. Other parameters such as availability, accessibility, etc. are also used in BPOL to specify a metric of the quality of the constructed business process. FIG. 5 describes an example procedure of checking the Web service capability to validate whether the service meets the requirements. A tool such as the Service Selection Agent 510 communicates with QoS Agents 520 or other requirement evaluation agents 525, which will use Web services Invoker 540, a proxy program that invokes Web services for a client requester (or application), to automatically invoke Web services 530 to check the capability of that Web service or fetch data from Web Service logging or caching database 535 to get the estimated quality. The QoS parameters of Web services are used to measure the quality of the Web services clusters for business process composition. Typically, the QoS parameters of a Web Service are: accessibility (measured by Accessibility Agent 521), response time (measured by Response Time Agent 522), security (measured by Security Checking Agent 523), availability, and so forth. The service selection agent tool 510, supported by an optimization algorithm 515, can get the response time by recording the invocation request time and result return time, for example. In the meantime, the accessibility can be measured by sending an invocation request several times during a specified period, for example 24 hours.

4. Automatic Generation of a Web Service Execution Language

The conventional difficulties of automatic programming language generation also occur in automatically generating WSFL within the WSOM. However, with the help of semantic information on Web services and BPOL, it is possible to implement a skeleton of WSFL. This skeleton is similar to a practical WSFL. Developers can construct a final WSFL by modifying the skeleton manually or interactively, thereby increasing the efficiency and correctness of the WSFL scripts being developed. ServiceProvider, activity, and controlLink required by WSFL can be generated by the WSOM from the BPOL. With the WSOM, a series of serviceProviders are obtained according to business requirements (BPOL). As in FIG. 4, Web Service clusters correspond to activities in the flowModel because Web Service clusters are organized into a business diagram, based on BPOL because that information is related to implementation rather than business logic.

In fact, this is a two-level procedure for generating a business process execution language. The first level is the business level and the second is the implementation level. At the business level, only conceptual business processes are taken into consideration, such as the customers' preferences, business process diagrams and the like. All the information at the business level should be converted into elements at the implementation level, such as binding information for Web services invocation. However, this automatic conversion is difficult if no semantic information is added to the signatures of Web services in UDDI registries. Therefore, only a skeleton WSFL can be generated automatically by the WSOM if no semantic information of Web services are provided.

5. Genetic Algorithm for Service Selection

The purpose of WSOM is to fully automate the end-to-end composition of business processes by using existing Web services. WSOM bridges the gap between the informal, subjective business requirements and the objective machine-readable business process execution language, such as BPEL4WS, WSFL, and XLANG. WSOM automates search script generation for Web services lookup; and it automates the process of selecting Web services by using a "pluggable" optimization framework, i.e. any suitable optimization algorithm can be plugged into the framework and used for process optimization. In this embodiment of the invention, we use Genetic Algorithm for service selection.

The optimization of service selection usually consists of finding the "point" in parameter space corresponding to the model that maximizes the fitness function. Genetic Algorithms are global and adaptive optimization techniques based on the mechanics of natural selection and natural genetics. They are often used to tackle the following optimization problems of the type:

$$\min\{f(C)|C \in IB^N\} \quad (9)$$

Assuming that for $$\forall C \in IB^N = \{0,1\}^N, 0 < f(C) < \infty$$

and $$f(C) \neq const$$

Equation (9) is equivalent to equation (8) because they have the same constraints and the same parameter space. Therefore, the second level of the service selection problem of the Web services outsourcing model can be solved by the genetic algorithm.

Genetic Algorithms (GAs) include steps that are very similar to biological evolution, such as selection, reproduction, crossover, and mutation. Selection is the process by which some individuals in a population are chosen, typically on the basis of favoring individuals with higher fitness. Reproduction is the creation of a new individual from a single parent. Crossover is a process that forms a new chromosome by combining parts of each of two parents' chromosomes. Mutation is the process that forms a new chromosome by making (usually small) alternations to the values of genes in a copy of a single, parent chromosome, as described by M. D. Vose in *The Simple Genetic Algorithm. Foundations and Theory*, (MIT Press: Cambridge, Mass.), 1999. These steps are called genetic operators. By the operator of mutation, GAs may reach a point in the solution space with non-zero probability, and they may converge to the global optimum if the best solution of a generation is always maintained in the offspring.

Figure 6:
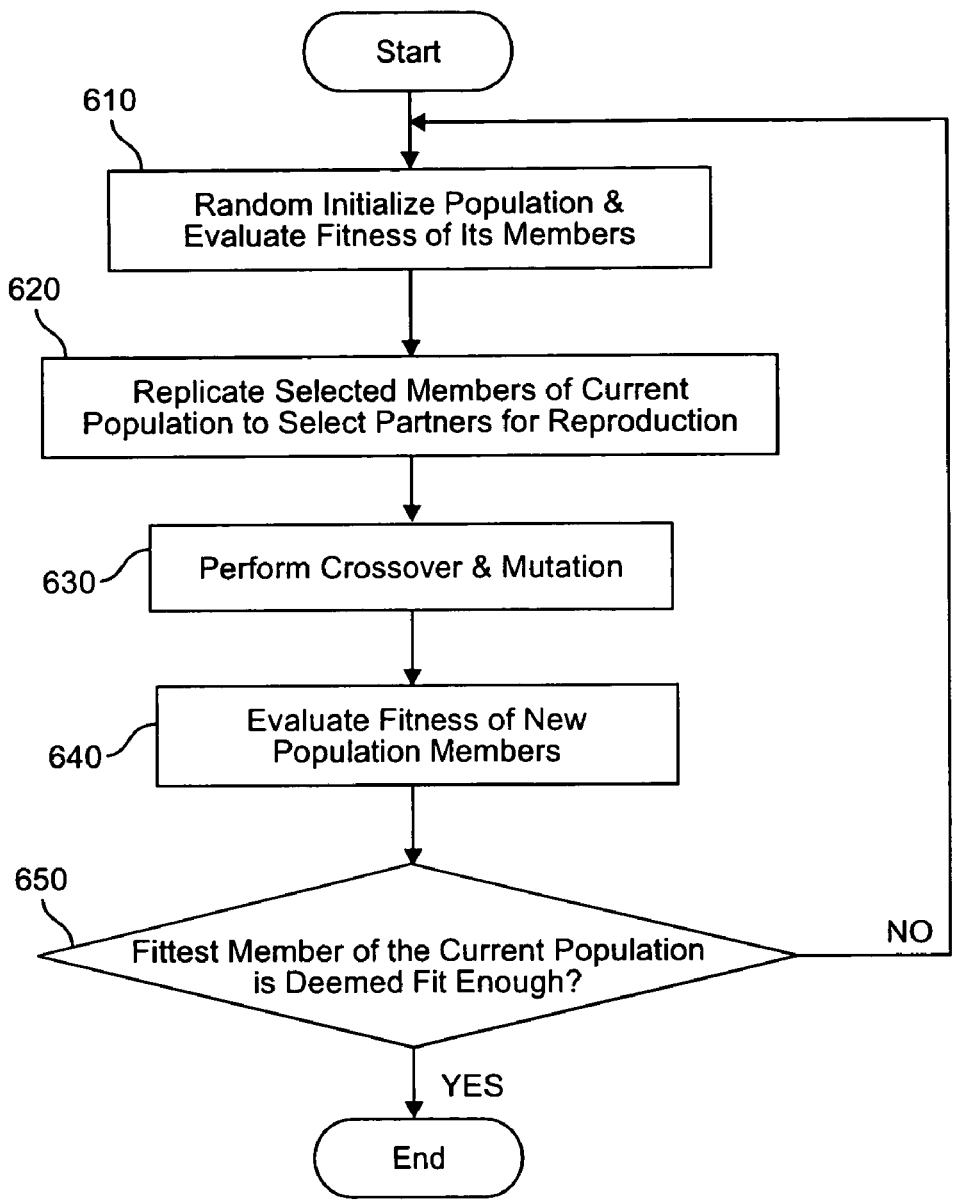
FIG. 6 is a procedure diagram for a genetic algorithm.

With reference to FIG. 6 we may define a population as a set of N realizations of the parameters S. A top-level view of a basic genetic algorithm is as follows:

(1) Randomly initialize population and evaluate fitness of its members (item 610);

(2) Replicate selected members of current population to select parents for reproduction (item 620);

(3) Perform crossover and mutation (item 630);

(4) Evaluate fitness of new population members (item 640);

(5) Repeat steps (2) through (4) until the fittest member of the current population is deemed fit enough (item 650).

L is the length of the gene string used in Genetic algorithms.

Genetic Algorithm Adapted for WSOM

A chromosome represents a potential business process, which in turn represents a solution to the business requirements. Each gene in a chromosome is a service candidate with two possible values of 0 and 1. If the value of gene is 1, it means the service is selected. If 0, the service is deselected. The combination of those genes forms a chromosome, which is a series of chosen services to meet the requirements.

Some changes occur in the adopted GA. According to the architecture shown in FIG. 3, each service a customer requires may have more than one provider and each provider has more than one service. As may be explained with reference to FIG. 7, in the basketball fan example there are four available Match Ticket 702 service providers (TempTicket.com, AZCompany.com, StatePress.com and Free.com), three news collection 706 providers (tempNews.com, myNews.com and Daily.com), etc. So when designing the chromosome, binary strings are designed in the following manner to express the situation.

$$\text{Chromosome} = [S11 \ S12 \ldots S1i|S21 \ S22 \ldots S2j|\ldots|Sn1 \ Sn2 \ldots Snk|] \quad (10)$$

Here, n is the number of Web services clusters, and i, j and k represent the number of potential services provided by one or multiple service providers for a specific Web services cluster. Snk represents a specific Web Service. Therefore Snk=$\{0,1\}$. It should be noted that at most only one service can be selected from each service cluster.

To get an optimum business process based on the business requirements several issues need to be considered. First, determine the Web service clusters required to fulfill the business processes to be generated, e.g. loan application, loan validation, credit validation, etc. Second, each service cluster can potentially be provided by more than one provider. Third, each provider's service has its own features. Fourth, all the required services have certain relationships. An optimum business process solution should take into account all of the above considerations.

Then two properties need to be defined, i.e. Fitness and Weights. Fitness is a value assigned to an individual that reflects how well the individual solves the task at hand. A fitness function is used to map a chromosome to a fitness value. Weight is a value assigned to a particular gene that is used to represent the importance of the gene in a chromosome. Therefore, designing the fitness function is essential to the successful use of GA. To obtain an appropriate Fitness, Weights are also important. Weights are designed based on customers' preferences and common sense in practical business procedures.

Typically, Cost and Time are two primary factors that customers are concerned about. In a preferred embodiment, Cost and Time are obtained using different approaches. The optimum cost is based on the services required by business requirements and services currently available in a registry. A binary string (chromosome) is designed to represent a business process solution. The best solution should be the string that leads to the lowest Cost.

To obtain the optimum (usually, the shortest) time, all the sequences in the services diagram are taken into account. First, the system uses GA to determine the shortest time consumption for each chromosome sequence. Second, from all of the shortest time consumptions, the sequence with the longest time consumption is selected. This value is the shortest Time consumption for the business. The sequences are generated automatically according to business requirements. For example, after all the information necessary to generate the diagram of the Basketball fan is entered, all the sequences in the diagram are created. In obtaining the shortest Time, the sequences are compared to get the shortest Time for the entire business process.

In addition to Cost and Time, other factors that may be important are Quality of Service (QoS), Bonus, etc. It is often the case that a business solution that satisfies the Cost optimization may not satisfy the Time or QoS optimization. So conflicted requirements need to be resolved. In this situation, the customer's preferences, when available, are used as tiebreakers. Otherwise, human decision makers need to step in the break ties, thus obtaining a final business solution.

Adaptation of the Genetic Algorithm to the present invention may be understood with reference to FIG. 6. In the GA adapted to the present invention, it is recommended that each and every member of each generation be assigned to a particular GA operations. To satisfy this requirement, in the WSOM GA, the sum of the probabilities of all three GA operations (mutation, crossover and selection probabilities) should be 1. This ensures all the members of the population are represented in the next generation.

According to experiments, even if worse chromosomes are dropped, it is possible that no best chromosomes are available, because the Crossover 630 and Reproduction 620 operations cannot bring enough new chromosomes to the next generation. If so, it would be difficult to obtain an optimum result. In this situation, the Mutation operation 630 is more important to the GA.

Figure 7:
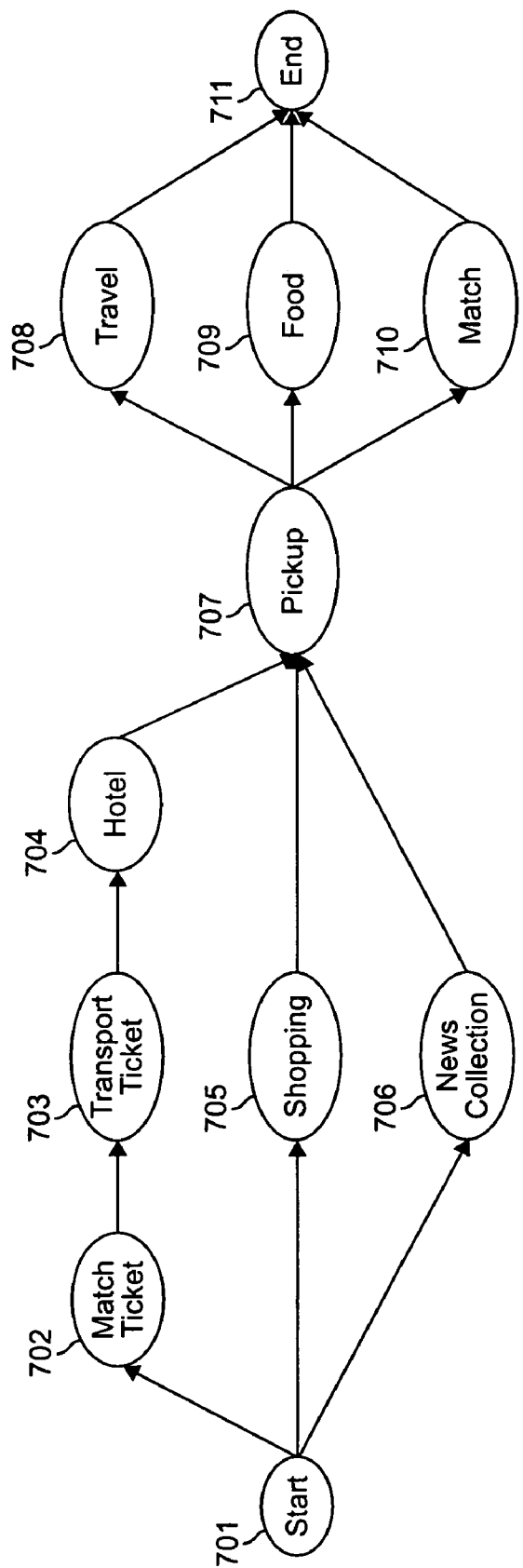
FIG. 7 is a Web services cluster flow diagram for the business requirements of a basketball fan.
Figure 12:
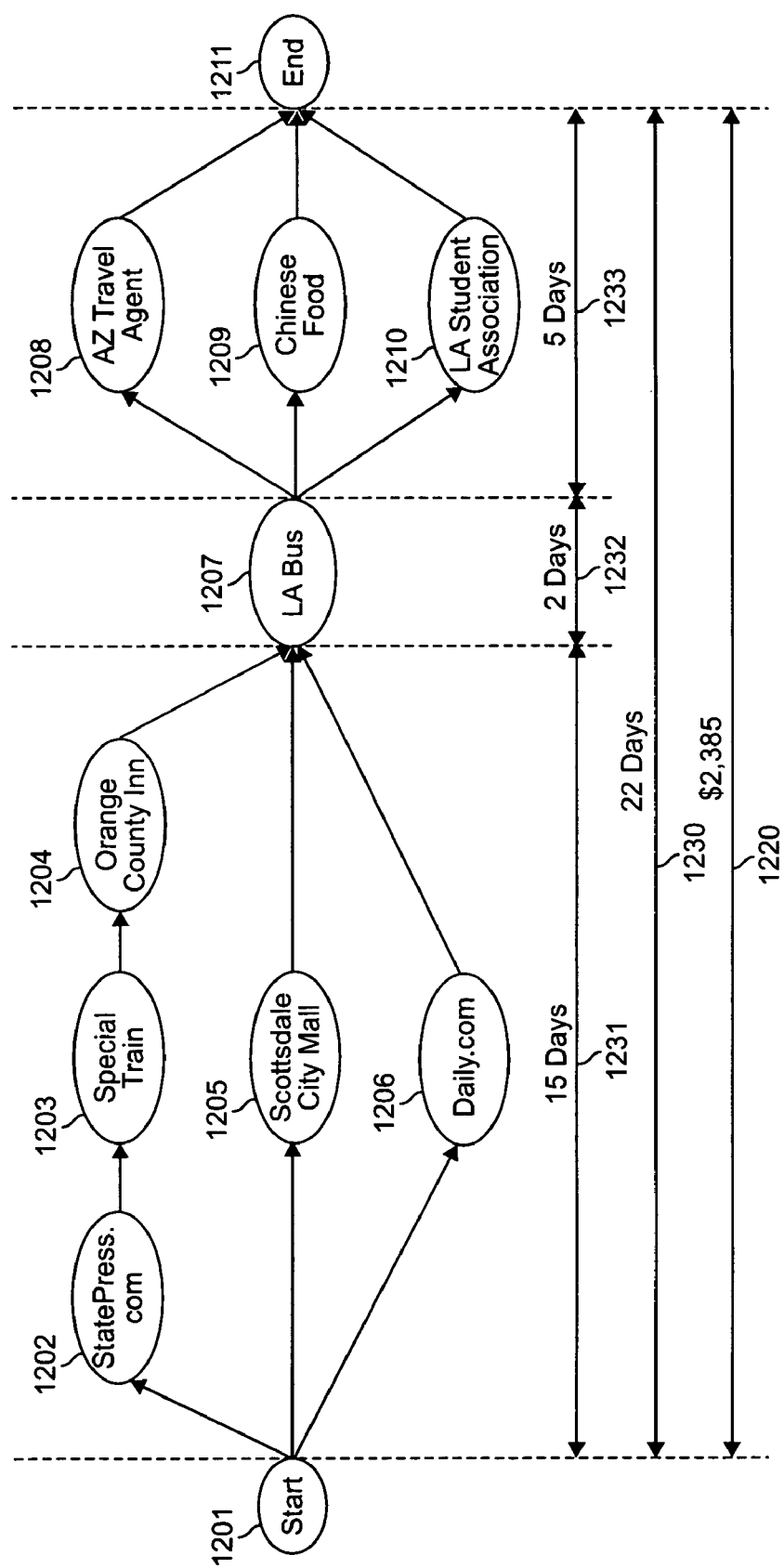
FIG. 12 is the Web services cluster flow diagram of FIG. 7, showing the travel time and costs obtained by the WSOM.
Figure 13:
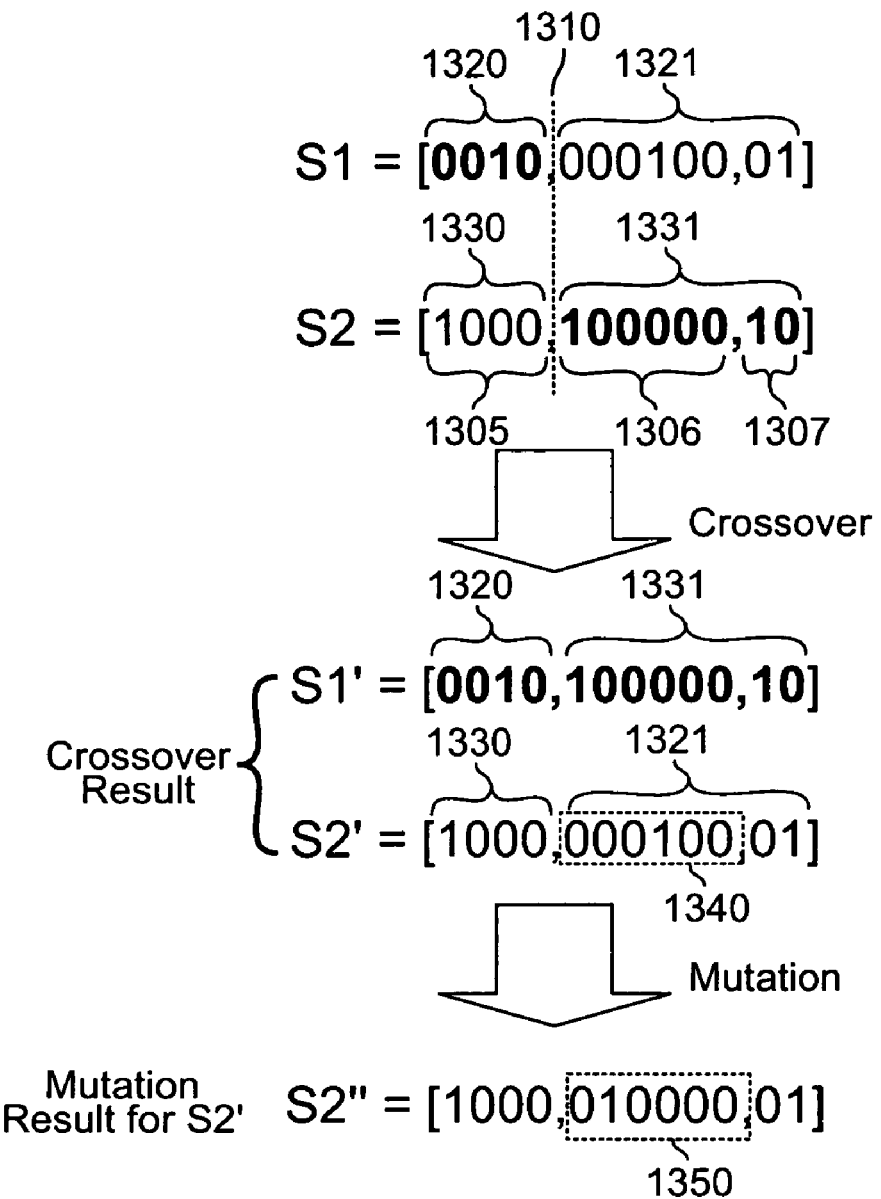
FIG. 13 is a diagram showing the operations of Crossover and Mutation upon chromosomes in the application of a Genetic Algorithm to business process outsourcing selections.

The operation of the Crossover and Mutation operations 630 may be understood with reference to FIG. 13. The chromosomes in FIG. 13 have been simplified to consider only the first three Web services clusters for application of the invention to a basketball fan's travel arrangements as shown in FIGS. 7 and 12 and in Table 1. As shown in Table 1, the Match Ticket cluster 702 (Web services cluster WS1 in Table 1) has four candidate services, and these services are represented by the first four binary digits 1305 in the chromosomes in FIG. 13. It will be noted that only one of these four candidate services can be selected, and therefore only one of the four binary digits has a value of "1". Similarly, the Transport Ticket cluster 703 (Web services cluster WS2 in Table 1) has six candidate services represented by the next six binary digits 1306 in the chromosomes in FIG. 13. The third Web services cluster WS3 in Table 1 is the Hotel cluster 704, which has two candidate services represented by the final two binary digits 1307 in the chromosomes in FIG. 13.

For a potential service selection, if we choose StatePress.com in the first Web services cluster (WS1) and choose US West and LA Hotel from WS2 and WS3 respectively, this service selection approach can be represented in the following gene string (a chromosome), which includes three sets of binary numbers, one for each of the three Web services clusters represented by the chromosome.

S1=[0010,000100,01]

Note that in the real implementation, there is no coma sign (",") between two digits. But the points in the gene string with a comma indicate the end of one cluster and the beginning of another and are potential crossover points for the crossover operation.

Suppose another potential solution is to select TempTicket.com from WS1, Regular Train from WS2, and Orange County Inn from WS3. Then we can represent this service selection solution in the following chromosome, which has the following three sets of binary numbers.

S2=[1000,100000,10]

When Genetic Algorithm (GA) performs crossover operation, the crossover points will be randomly selected based on a given crossover rate (e.g. a probability). For example, if the first point with coma sign has been selected for performing crossover between S1 and S2, the two chromosomes are divided at a cluster boundary 1310 and exchange their chromosome contents beyond the crossover point 1310. Chromosome S1 is comprised of gene string 1320 before the crossover point 1310 and gene string 1321 after crossover point 1310. Similarly, chromosome S2 is comprised of gene strings 1330 and 1331. After the crossover operation the respective chromosomes S1' and S2' are now comprised of gene strings 1320+1331 and 1330+1321, respectively.

There is also a possibility for the Genetic Algorithm (GA) to perform a mutation operation for selected chromosomes (e.g. potential Web service selection solutions). The frequency for the mutation operation is defined by a mutation rate. Suppose the second binary set in S2' (cluster WS2) will perform a mutation operation. As shown in FIG. 13, chromosome S2' shows selection of the fourth candidate service (US West) in the second cluster 1340. After the mutation operation, the second candidate service is now shown as selected, as indicated in the mutated second cluster 1350 of chromosome S2".

Two possible solutions to the operation of mutation are: 1) set up a higher mutation probability; and 2) change the mutation probability dynamically (see Liang-Jie Zhang, Zhi-Hong Mao, Yan-Da Li, *Mathematical Analysis of Mutation Operator in Generic Algorithms and Its Improved Strategy*, International Conference on Neural Computing, Beijing, 1995). The first solution is appropriate for two situations: a) a small initial population is available, and b) worse chromosomes are dropped quickly. Under those conditions, the mutation operation can generate more chromosomes for the next generation to increase the probability of obtaining the optimum ones.

The second solution is appropriate for the situation where the initial population is large and worse chromosomes are not dropped quickly. With the decreasing number of chromosomes in each generation and the increasing number of generations, the mutation probability will increase in order to avoid the ineffectiveness of crossover and reproduction operations. In conclusion, if the population size in the recent generations is lower than a particular value and the terminating condition cannot be met for a certain number of generations, it is appropriate to increase the mutation probability.

The Initial Population is the original solution space. In theory, it is better to try to obtain a larger initial population. With a large initial population, it is more likely that a final optimum selection will be reached with a lower number of generations. But usually it takes a long time and is sometimes difficult to obtain a large population. It is essential to strike a balance between the need for a large initial population and the efficiency of the GA.

The Mating Pool Threshold is the value that is used to evaluate the fitness of chromosomes. Usually, the Mating Pool Threshold is calculated by the following formula.

$$\text{Mating Pool Threshold} = 1/\text{Number of Initial Population} \tag{11}$$

That means a chromosome will be dropped if the ratio of its fitness to the total of the fitness values of all the chromosomes in the population is less than the Mating Pool Threshold. The Mating Pool Threshold is a suitable standard to reduce the worse chromosomes in each generation.

In general, there are two types of optimizations, maximum and minimum. The optimization type is expressed by a flag that indicates whether the GA optimum is a maximum or minimum. If the value of the flag is 1, the optimum is the maximum. If the value is 0, the optimum is the minimum.

Both the Repeating Times of Best Values and the Total Generation are terminating flags of the GA. In the GA of WSOM, when one fitness is kept the same for more than the Repeating Times of Best Values, it is considered as the optimum and the GA is terminated.

The Total Generation is usually set up as an unlimited value. In general, it is hard to reach such a large number of generations in the GA of WSOM. If the Total Generation value is reached, it means that no optimum is available and the GA is terminated.

Although the GA can be applied in many situations, there are still some differences when applied to specific areas of optimization. For example, Cost and Time are processed in different ways in the WSOM. So it is necessary to specify expected optimization indicators before running the GA. Further, it is sometimes necessary to add constraints to the random functions in the GA. In the GA of WSOM, a constraint is added to ensure each random value is different for operations on each generation. For example, there is a mutation pool for each generation. In the mutation pool, there are some chromosomes. When doing mutation, the mutation point is generated by a random function. With the constraint, it is better that the mutation point for each chromosome is different. Therefore, each mutation operation will generate a new chromosome, thereby increasing the effectiveness of mutation.

From equation (10), for each Web Service cluster, there should be one and only one service should be selected to map this Web services cluster to a real Web Service. In traditional GA, the crossover point is randomly selected. Moreover, according to mathematical analysis (as shown in Liang-Jie Zhang, Zhi-Hong Mao, Yan-Da Li, *Mathematical Analysis of Crossover Operator in Generic Algorithms and Its Improved Strategy*, IEEE Conference on Evolutional Computing, Australia, 1995, pp.412–417, hereafter "*Mathematical Analysis of Crossover Operator*"), the optimal strategy should be: the two parent strings with length N perform crossover in the [N/2] bits randomly. In this invention, a sufficient exchanging mechanism (based on the analysis shown in "*Mathematical Analysis of Crossover Operator*") is to crossover in [N/2] bits randomly in parent string with length N. From the simulation results, it is found that this sufficient exchanging mechanism has performed more efficiently than the classical crossover mechanism.

In addition, in WSOM, a variant crossover point selection mechanism, constrained crossover point selection, is used to make sure the multiple genes for a Web Service cluster can be grouped together. As individual Web services clusters, separated by "|" in (10), the potential crossover point can only be chosen in the position of separation sign "|".

6. A Case Study

A practical business process composition example is shown in FIG. 7. Through this example it is easy to understand how a real life business process is configured by the invention. If a travel agency is to create a business process to fulfill all services needed so that a basketball fan from Phoenix can visit Los Angeles to watch the Basketball games, all the following services needed for the fan's trip need to be organized in an appropriate order, as shown in FIG. 7.

Order match tickets (Match Ticket 702);
Order transportation tickets (Transport Ticket 703);
Research hotels (Hotel 704);
Do some shopping for the trip (Shopping 705);
Collect news for the games (News Collection 706);
Reserve pick-up services (Pickup 707);
Make a travel schedule besides watching soccer games (Travel 708);
Reserve food to enjoy the days in LA (Food 709);
Reserve match services (Match 710).

Certain sequencing relationships exist between and among the above services, i.e. it is appropriate to perform certain services before or after others, while other services may be done in parallel. A parallel relationship means that services in the same set can be processed concurrently, without dependence on other services in the set. A sequential relationship means that services in the same set must be processed in a certain order. If one service is not finished, another one cannot be started.

According to the above descriptions, the Basketball fan's business requirements can be represented as a Web services cluster flow shown in FIG. 7. There are nine expected services or Web services clusters, which are to be selected for the business process composition for the Basketball fan. Some services having a parallel relationship as shown in the diagram are [Match Ticket 702, Shopping 705, News Collection 706], [Hotel 704, Shopping 705, News Collection 706], and [Travel 708, Food 709, Match 710]. Some sequential relationships shown in the diagram are [Start 701, Shopping 705, Pickup 707, Food 709, End 711], [Start 701, News Collection 706, Pickup 707, Travel 708, End 711] and [Start 701, Shopping 705, Pickup 707, Match 710, End 711].

Furthermore, as specified in a preference file, the preferred UDDI registries are searched for available services in each cluster, e.g., for the Match Ticket 702: TempTicket.com, AZCompany.com, StatePress.com and Free.com; Transportation Tickets 3: Train.com and Airplane.com; News Collections 706: CNN.com, ESPN.com and Yahoo.com, etc. Each provider also provides different types of services. For example, in TempTicket.com, customers can buy the best seat tickets, the second best seat tickets and the regular seat tickets.

It is the WSOM's job to help customers figure out an optimum business solution from all the available services. Based on the advanced Web services discovery engine, the outsourcing manager can match and select Web services, and then compose and assemble an optimal business process satisfying the business requirements.

7. Research Prototype of WSOM

The WSOM provides a set of java APIs and Web services Interface for integration. One sample scenario is built on WebSphere Studio Workbench, an Eclipse tooling platform, an open extensible IDE. The WSOM can be installed as a new perspective for WebSphere Studio and WebSphere Studio Application Developer to dynamically construct a new business process using existing Web services based on business requirements. Four main components of WSOM are open to developers to integrate into their own applications are: BPOL Analyzer, USML script for advanced Web services discovery engine, Service Selection Agent, and Genetic Algorithm. This plug-able architecture also allows developers to extend and replace the current major components with their developed technologies or modules.

Figure 8:
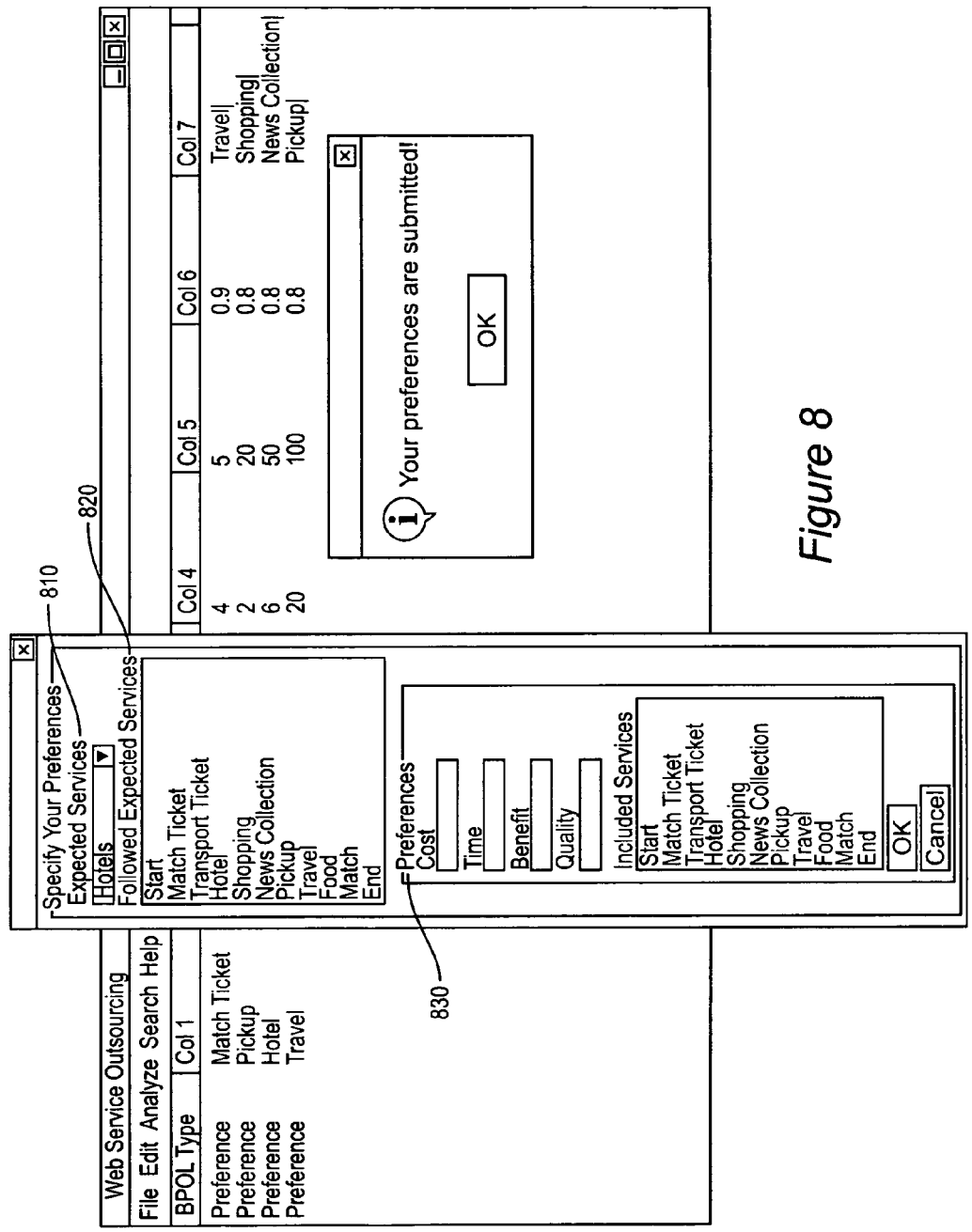
FIG. 8 is a screen shot showing the WSOM user interface which allows the customer to specify business preferences.

The FIG. 8 screen image shows the user interface of the WSOM, where a customer can specify business preferences. The following steps are needed to input their business preferences.

1) Select a service cluster from the expected service list 810;
2) Specify service clusters 820 to follow for each selected service cluster; according to that information, the WSOM is able to construct an expected business process diagram, e.g. as shown in FIG. 7;
3) Specify preferences 830 for the service cluster; at present, the preferences include Cost, Time, Benefit, Quality and possibly abstract services listed under "Included Services."

Figure 9:
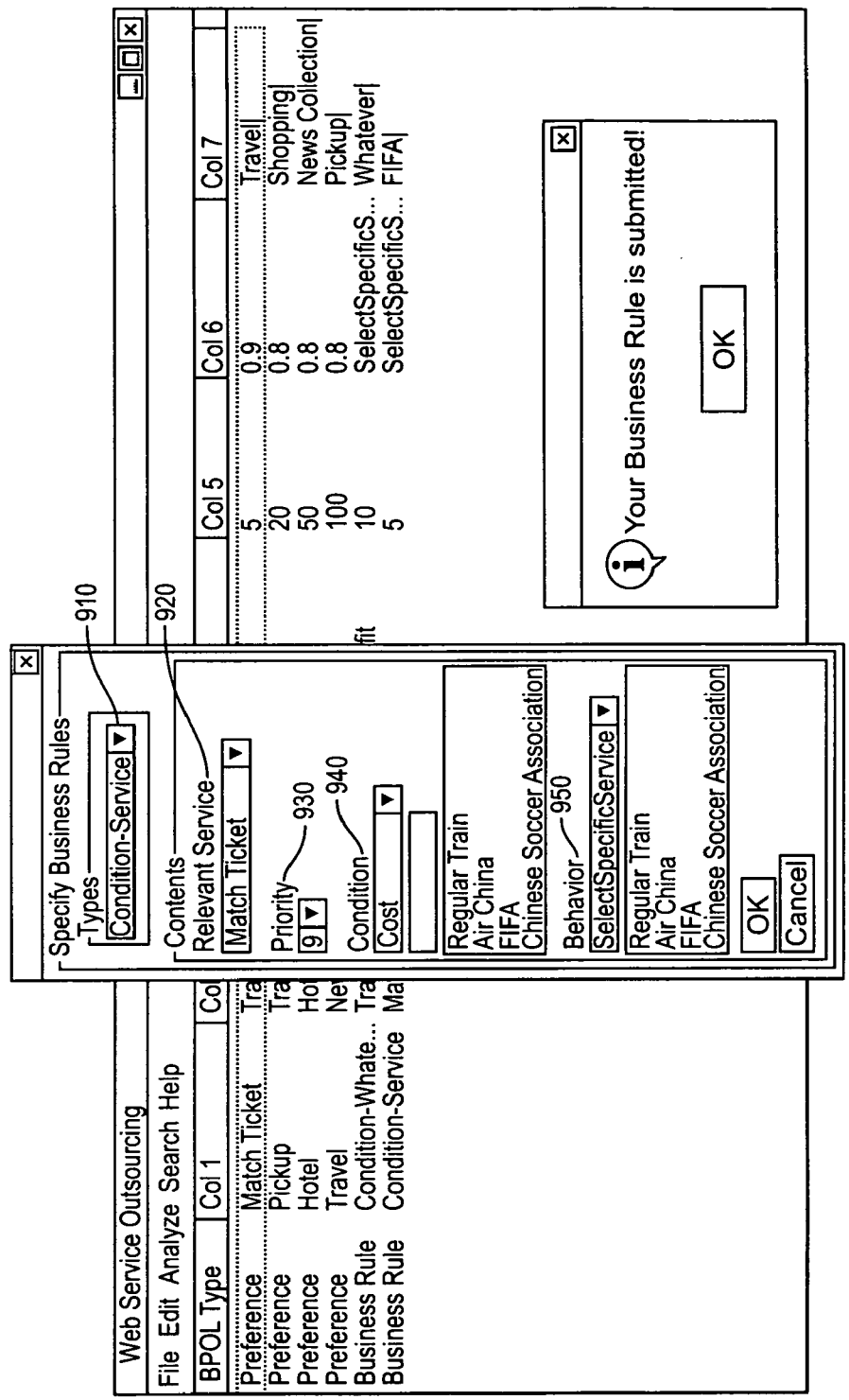
FIG. 9 is a screen shot showing customer input of business rules into the WSOM.

The FIG. 9 screen image shows how customers input business rules into the WSOM. The following steps are needed to input business rules into the WSOM:
1) Specify types of business rules in the list of Types 910;
2) Specify the rule related to service clusters in the Relevant Service 920 list;
3) Specify the priority 930 of the rule;
4) Specify the condition 940 of the rule; in general, the conditions contain the information on service preferences, such as Cost, Time and so on;
5) Specify the corresponding behaviors 950 of the rule, i.e., under a certain condition, the behavior will occur.

In addition, one implementation of the invention provides two mechanisms to capture the business requirements from the customers, namely, GUI based BPOL Analyzer and program based BPOL converter. The GUI based BPOL analyzer is part of an Eclipse based WSOM, which provides a set of interactive interfaces to capture business requirements, preferences, business rules and then automatically generate BPOL document.

Figure 10:
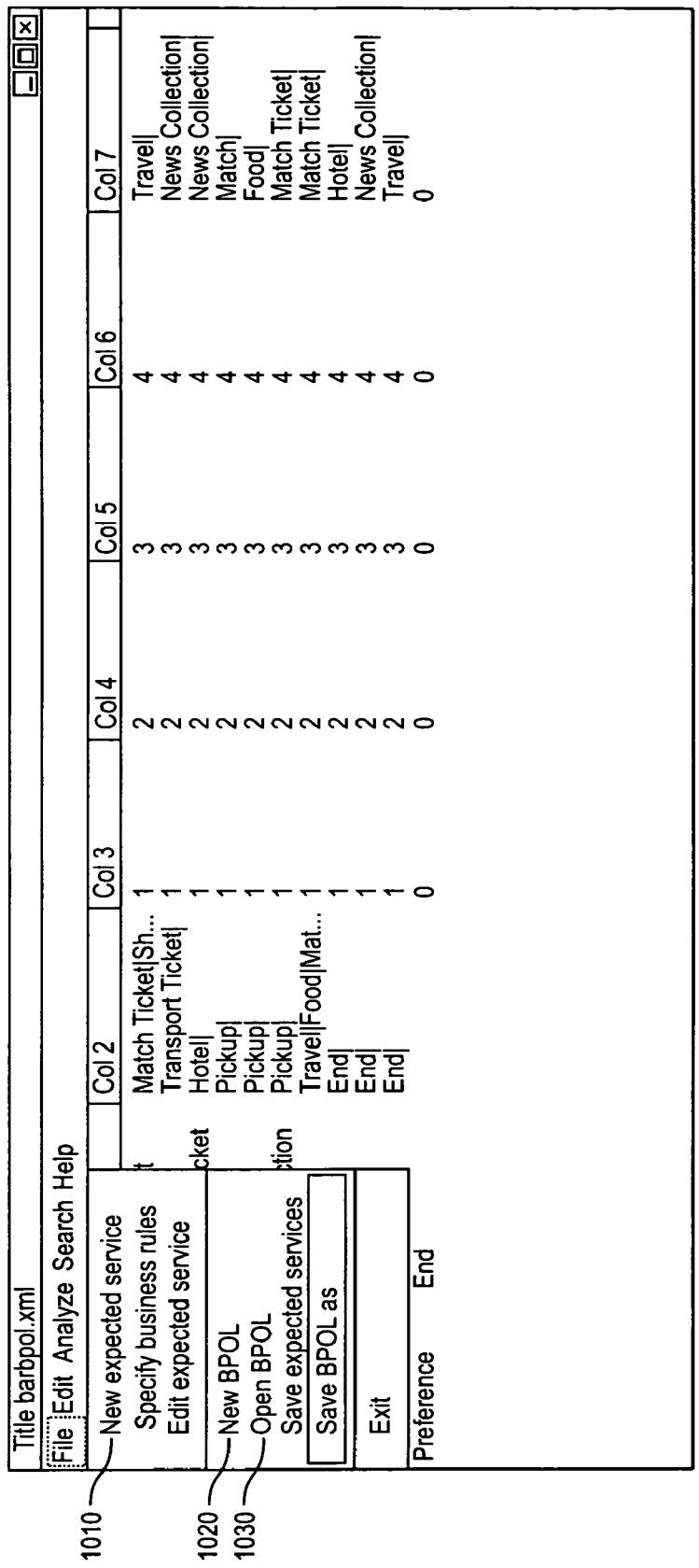
FIG. 10 is a screen shot showing a wizard to automate BPOL creation.

As shown in the FIG. 10 screen shot, the WSOM also provides a wizard to automate capturing the requirements (i.e. making new entries using the "New Expected Service" 1010 menu item), BPOL creation (i.e. using the "New BPOL" 1020 menu item to create a BPOL, or using the "Open BPOL" 1030 menu item to open an existing BPOL which can then be modified by adding new entries). At the same time, the decision maker or customer can monitor the entire process. If necessary, the customer can use the interface to manually modify the result or tune up the constructed business process. The output of the WSOM can be configured to generate execution language documents such as WSFL, as shown in FIG. 11 (item 1110). Note the WSOM can be easily adapted to generate BPEL via a separate output adaptor The resulting business process obtained by the WSOM for customers can be further adjusted based on changing conditions. As the business process evolves, changes will need to be made. Therefore, the run-time execution behaviors of an automatically constructed business process must be carefully monitored, evaluated and adapted for the expected quality of service. Customers might encounter changes in the business plan, or find that the initial information supplied to the WSOM is insufficient. Therefore, it is essential to provide customers with capabilities to tune the generated business process. After the tuning, the WSOM will provide a new process analysis based on the updated information the new performance information for customers to evaluate. Thus, a final optimum business process can be obtained. Run-time business processes selections will be discussed in detail below.

Table 1 lists the sample Web services clusters WS1 to WS9 (corresponding to items 702 to 710 in FIG. 7) in the first column "Web services cluster". The second column, "Description," provides a short descriptive statement indicating what the Basketball fan is seeking from the cluster. The candidate Web services are shown in the third column "Candidate Services." These candidates were discovered from UDDI registries or WS-Inspection documents, as shown in FIG. 3 (where Advanced Web Services Discovery Engine 303 queries UDDI registry 311 and develops an available service list 308). In general, the WSOM searches the UDDI registry so as to narrow down the scope of possible service candidates by business names, categories and so on, if specified in the business requirements. After that filtering process, the resulting list of Web services are invoked by the WSOM to obtain real values such as Cost, Time and so forth. Table 1 shows the Cost (in US dollars) and Time (in Days) in the fourth and fifth columns.

TABLE 1

A Basketball Fan's Traveling Process

| Web services cluster | Description | Candidate Services | Cost (US $) | Time (Days) | Normalized Cost | Normalized Time | Weighted Cost (0.6) | Weighted Time (0.4) | Service Value [Formula (8)] | Maximum Cost | Maximum Time |
|---|---|---|---|---|---|---|---|---|---|---|---|
| WS1 (Match Ticket) | Basketball fans can buy tickets from those providers | TempTicket.com | 400 | 3 | 0.80 | 0.30 | 0.192 | 0.018 | 0.210 | 500 | 10 |
| | | AZCompany.com | 500 | 2 | 1.00 | 0.20 | 0.300 | 0.008 | 0.308 | | |
| | | StatePress.com | 330 | 5 | 0.66 | 0.50 | 0.131 | 0.050 | 0.181 | | |
| | | Free.com | 0 | 10 | 0.00 | 1.00 | 0.00 | 0.200 | 0.200 | | |
| WS2 (Transport Ticket) | Basketball fans can select transportation manners from those providers | Regular Train | 200 | 2 | 0.31 | 1.00 | 0.041 | 0.200 | 0.241 | 650 | 2 |
| | | Express Train | 300 | 2 | 0.46 | 1.00 | 0.063 | 0.200 | 0.263 | | |
| | | Special Train | 500 | 1 | 0.77 | 0.50 | 0.178 | 0.050 | 0.228 | | |
| | | US West | 600 | 1 | 0.92 | 0.50 | 0.254 | 0.050 | 0.304 | | |
| | | Air Northern | 550 | 1 | 0.85 | 0.50 | 0.217 | 0.050 | 0.267 | | |
| | | US Union | 650 | 1 | 1.00 | 0.50 | 0.300 | 0.050 | 0.350 | | |
| WS3 (Hotel) | Two Hotels are available for basketball fans | LA Hotel | 400 | 2 | 1.00 | 0.67 | 0.300 | 0.090 | 0.390 | 400 | 3 |
| | | Orange County Inn | 300 | 3 | 0.75 | 1.00 | 0.169 | 0.200 | 0.369 | | |
| WS4 (Shopping) | Three stores can be selected to order merchandises for basketball fans' trip | Tempe Center Mall | 350 | 5 | 0.70 | 1.00 | 0.147 | 0.200 | 0.347 | 500 | 5 |
| | | Scottsdale City Mall | 250 | 3 | 0.50 | 0.80 | 0.075 | 0.128 | 0.203 | | |
| | | Arizona Mall | 500 | 2 | 1.00 | 0.40 | 0.300 | 0.032 | 0.332 | | |
| WS5 (News Collection) | Basketball fans need to collect news for their favorite matches | tempNews.com | 100 | 4 | 1.00 | 1.00 | 0.300 | 0.200 | 0.500 | 100 | 4 |
| | | myNews.com | 80 | 3 | 0.80 | 0.75 | 0.192 | 0.113 | 0.305 | | |
| | | Daily.com | 30 | 2 | 0.30 | 0.50 | 0.027 | 0.050 | 0.077 | | |
| WS6 (Pickup) | Three pickup services can be chosen | Supper Shuttle | 30 | 4 | 0.80 | 1.00 | 0.192 | 0.200 | 0.392 | 50 | 4 |
| | | LA Taxi | 50 | 3 | 1.00 | 0.75 | 0.300 | 0.113 | 0.413 | | |
| | | LA Bus | 5 | 2 | 0.10 | 0.50 | 0.003 | 0.050 | 0.053 | | |

TABLE 1-continued

A Basketball Fan's Traveling Process

| Web services cluster | Description | Candidate Services | Cost (US $) | Time (Days) | Normalized Cost | Normalized Time | Weighted Cost (0.6) | Weighted Time (0.4) | Service Value [Formula (8)] | Maximum Cost | Maximum Time |
|---|---|---|---|---|---|---|---|---|---|---|---|
| WS7 (Travel) | Two travel agencies can become basketball fans' candidates | AZ Travel Agency | 1000 | 5 | 0.83 | 0.83 | 0.207 | 0.138 | 0.345 | 1200 | 6 |
| | | LA Travel Agency | 1200 | 6 | 1.00 | 1.00 | 0.300 | 0.200 | 0.5 | | |
| WS8 (Food) | Basketball fans need to enjoy food during the period of watching matches | Chinese Food | 300 | 2 | 0.50 | 0.50 | 0.075 | 0.050 | 0.125 | 600 | 4 |
| | | US Food | 400 | 4 | 0.67 | 1.00 | 0.135 | 0.200 | 0.335 | | |
| | | Japanese Food | 600 | 4 | 1.00 | 1.00 | 0.300 | 0.200 | 0.500 | | |
| WS9 (Match) | Basketball fans can get match services from the three providers | CA Basketball Association | 500 | 2 | 0.91 | 1.00 | 0.248 | 0.200 | 0.448 | 550 | 2 |
| | | LA Student Association | 300 | 2 | 0.55 | 1.00 | 0.091 | 0.200 | 0.291 | | |
| | | LA Basketball Service | 550 | 1 | 1.00 | 0.50 | 0.300 | 0.050 | 0.350 | | |

In the above table, the service value is calculated through the formula (8). It should be noted that here the value of $R_i^d$ is equal to 0, which means that customers expect to get the minimum of the combination of Cost and Time. From the Service Selection Agent, the final business process is constructed by the following service set:

$$S^* = \{0010, 001000, 01, 010, 001, 001, 10, 100, 010\}$$

It should be noted that this service set contains nine sets of binary numbers, one for each of the Web services clusters WS1 through WS9 shown in Table 1. Each binary number contains a digit for each candidate service, and a single "1" for the candidate service selected. Also note that within each Web services cluster normalized values for Cost and Time (the sixth and seventh columns of FIG. 1) are determined by giving the maximum value a normalized value of unity (1.0). Weighted values for Cost and Time (shown in the eighth and ninth columns of FIG. 1) are determined by a calculation that gives desired weights, in accordance with the service value metric shown in Equation 8.

This calculation may be understood from the following example, using Equation 8. With reference to FIG. 7 and Table 1, assume an expected traveling time of zero (0) days and an expected expense of zero (0) dollars. In that case, $R_i^d = 0$ (i=1, 2). Here $R_1^d$ is the expected days specified in the customer requirement annotation data (e.g. BPOL). $R_2^d$ is the expected expense in this trip. Therefore the service value can be calculated in the following simpler way:

$$\text{Service Value} = \sum_{i=1}^{i=P} E_i = \sum_{i=1}^{P} \left[ \frac{1}{2} w_i (R_i^*)^2 \right]$$

In the example shown in Table 1, take the first service "TempTicket.com" as an example, the normalized cost=400/500=0.8; the normalized time is 3/10=0.3. Since we just picked up two requirement indicators (Cost and Time), then we can set P=2 in the Service Value equation. That is $$\text{Service Value} = \sum_{i=1}^{i=P} E_i = \sum_{i=1}^{P} \left[ \frac{1}{2} w_i (R_i^*)^2 \right] = \frac{1}{2} w_1 (R_1^*)^2 + \frac{1}{2} w_2 (R_2^*)^2$$

In Table 1, the weighted cost and weighted time correspond to $$\frac{1}{2} w_1 (R_1^*)^2$$

and $$\frac{1}{2} w_2 (R_2^*)^2$$

respectively.

In the example shown in Table 1, the weighted cost of the first service "TempTicket.com" is 0.192. This resulted from the following calculation process:

$$\frac{1}{2} w_1 (R_1^*)^2 = \frac{1}{2} * 0.6 * (0.8)^2 = 0.192$$

The weighted time of the same service is 0.018 derived from the following calculation process:

$$\frac{1}{2} w_2 (R_2^*)^2 = \frac{1}{2} * 0.4 * (0.3)^2 = 0.018$$

After getting the optimum result, using an optimization algorithm such as GA, the final business requirement diagram may be shown with reference to FIG. 12. FIG. 12 is very similar to FIG. 7, with the nine Web services cluster titles 702 to 710 replaced by the name of the corresponding selected services 1202 to 1210. Furthermore, FIG. 7 is annotated to show two indicators, Cost 1220 and Time 1230. As usual, there needs to be a balance between the Cost and the Time when calculating the Service Value (the tenth column in Table 1). Different weights on indicators should be taken into consideration when obtaining the optimum service selection from all available services in a UDDI registry. The final Service Value is calculated based on the combination of normalized and weighted Cost and Time, or some other suitable measure that will be evident to one skilled in the art.

WSRL is an XML-based description of relationships between Web services at various levels, i.e., business entity level, Web Service Level and operation level. When composing business processes, the WSOM is only concerned with relationships at the business entity level and Web Service level. There are several reasons that relationship between business entities are important in composing business processes with Web services: 1) service providers or business entities may have formed an alliance among themselves and would prefer to work with services providers within the alliance, i.e., customers may get discounts or better service; 2) business entities may be competitors and they will not work with their competitors. List 5 shows a partner relationship between AZCompany.com and AZTravelAgency and List 6 shows a competitor relationship between SupperShuttle and LATravelAgency.

List 5. The Example of WSRL Between Business Entities

```
<?xml version="1.0"?>
<!DOCTYPE wsrl SYSTEM "wsrl.dtd">
<wsrl>
  <bbr>
    <partnership id=p1>
      <source>
        <name> AZCompany.com </name>
        <link type="uddi-location">
          <location>http://www.azcompany.com/uddi?
            4C9DADD0-5C39-11D5-9FCF-BB3200333F79
          </location>
        </link>
      </source>
      <target>
        <name> AZTravelAgency </name>
        <link type="uddi-location">
          <location>http://www.aztravelagency.com/uddi?
            4C9DADD0-5C39-11D5-3FCF-BB4500333F88
          </location>
        </link>
      </target>
    </partnership>
  </bbr>
<wsrl>
```

List 6. The Example of WSRL Between Business Entities

```
<?xml version="1.0"?>
<!DOCTYPE wsrl SYSTEM "wsrl.dtd">
<wsrl>
  <bbr>
    <exclusion id=ex1>
      <source>
        <name>SuperShuttle</name>
        <link type="uddi-location">
          <location>http://www.supershuttle.com/uddi?
            4C9DADD0-5C38-11D5-6FCF-BB3200333F07
          </location>
        </link>
      </source>
      <target>
        <name> LATravelAgency </name>
        <link type="uddi-location">
          <location>http://www.latravelagency.com/uddi?
            4C9DADD0-5C69-11D5-2FCF-BB4500334F02
          </location>
        </link>
      </target>
    </exclusion>
  </bbr>
<wsrl>
```

Relationships between businesses are reflected at the Web Service level. At this level, certain services among service providers may be related to each other. When customers make their selections, those relationships may influence the cost, time and the like. For example, again referring to Table 1, the Basketball fan might select Scottsdale City Mall to do shopping and reserves Chinese food because both of the two service providers cost the Basketball fan the least in shopping clusters (WS4) and food clusters (WS8), respectively. The cost is $550 ($250+$300). But, if there is an alliance between Tempe Center Mall and US Food, the Basketball fan's selection might be changed. For example, the alliance claims that there is 30% discount if customers select both of them. The cost will be $525=($350+$400)*(1–30%). Under this situation, the Basketball fan must select the alliance to fulfill his minimum cost requirement. List 7 shows the Web Service level relationships between Tempe Center Mall and US Food.

List 7. The Example of WSRL Between Web services

```
<?xml version="1.0"?>
<!DOCTYPE wsrl SYSTEM "wsrl.dtd">
<wsrl>
  <bbr>
    <partnership id=p1>
      <source>
        <name> AZCompany.com </name>
        <link type="uddi-location">
          <location>http://www.azcompany.com/uddi?
            4C9DADD0-5C38-11D5-6FCF-BB3200335F07
          </location>
        </link>
      </source>
      <target>
        <name> AZTravelAgency </name>
        <link type="uddi-location">
          <location>http://www.aztravelagency.com/uddi?
            4C9DADD0-5C39-11D5-3FCF-BB4500333F88
          </location>
        </link>
      </target>
    </partnership>
  </bbr>
<wsrl>
```

The WSOM is capable of handling this scenario using element, "RelationLink", in BPOL. Based on the data described by the link, the WSOM obtains relationship information between service providers and services. Based on the relationships, the WSOM is able to obtain the practical and optimum business solutions for customers.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for composing an optimal business process using existing Web services, comprising the steps of:

capturing customer business requirements;

recording said business requirements in a uniform representation, said uniform representation using a standard vocabulary of terms for specifying tasks satisfying said business requirements and using a language structure for relating said specified tasks in a business process flow;

automatically generating a search script from said uniform representation, said search script being usable by Web services to identify one or more service providers for each of said specified tasks, said one or more identified service providers being placed on a qualified service list for said specified task;

using an optimization algorithm to automatically select a service provider for each task from said respective qualified service list, said optimization algorithm optimizing said business process flow; and automatically transforming the optimal business process into a business process flow language for execution.

2. The method of claim 1, wherein the optimal business process consists of one or more Web services, each said Web Service being categorized by its task and a collection of services with the same category being identified as a Web services cluster.

3. The method of claim 2, wherein said relating of specified tasks comprises parallel and sequential relationships among the Web services clusters, and said language structure uses flow rules to describe said relationships.

4. The method of claim 3, wherein said uniform representation is a Requirement Annotation, said flow rules being described by said Requirement Annotation, and wherein said business requirements are described with a customer preference, business rules, a relational link and event/action mappings.

5. The method of claim 4, wherein the customer preference is captured in a Business Process Outsourcing Language (BPOL).

6. The method of claim 4, wherein said business rules comprise derivation rules and event rules, and wherein one or more steps of a business process can be encoded in the form of reaction rules using the event rules, said encoding enabling seamless integration of template based composition of said business process flow with event-driven composition of said business process flow.

7. The method of claim 4, wherein said relational link describes a relationship among business entities, business services and operations at different granularities.

8. The method of claim 4, wherein an event list is used to capture said event/action mappings for event driven composition of business process flow.

9. The method of claim 4, wherein said Requirement Annotation is used to generate a search script to perform a multiple search query via an advanced Web Service discovery engine, said Web Service discovery engine dynamically finding a narrowed-down list of Web services needed to compose the optimal business process.

10. The method of claim 2, wherein said optimization algorithm is a Genetic Algorithm, and a Web services cluster is represented as a single "gene" and a business process is represented as a single "chromosome" having a plurality of "genes" within said Genetic Algorithm, and wherein an optimal chromosome is converted back to the optimal business process after application of the Genetic Algorithm.

11. The method of claim 1, further comprising the step of providing an output adaptor to automatically convert the optimal business process into a flow language.

12. A system for composing an optimal business process using existing Web services, comprising:

means for capturing customer business requirements;

means for recording said business requirements in a uniform representation, said uniform representation using a standard vocabulary of terms for specifying tasks satisfying said business requirements and using a language structure for relating said specified tasks in a business process flow;

means for automatically generating a search script from said uniform representation, said search script being usable by Web services to identify one or more service providers for each of said specified tasks, said one or more identified service providers being placed on a qualified service list for said specified task;

means for using an optimization algorithm to automatically select a service provider for each task from said respective qualified service list, said optimization algorithm optimizing said business process flow; and means for automatically transforming the optimal business process into a business process flow language for execution.

13. The system of claim 12, wherein the optimal business process consists of one or more Web services, each said Web Service being categorized by its task and a collection of services with the same category being identified as a Web services cluster.

14. The system of claim 13, wherein said relating of specified tasks comprises parallel and sequential relationships among the Web services clusters, and said language structure uses flow rules to describe said relationships.

15. The system of claim 14, wherein said uniform representation is a Requirement Annotation, said flow rules being described by said Requirement Annotation, and wherein said business requirements are described with a customer preference, business rules, a relational link and event/action mappings.

16. The system of claim 15, wherein the customer preference is captured in a BPOL.

17. The system of claim 15, wherein said business rules comprise derivation rules and event rules, and wherein one or more steps of a business process can be encoded in the form of reaction rules using the event rules, said encoding enabling seamless integration of template based composition of said business process flow with event-driven composition of said business process flow.

18. The system of claim 15, wherein said relational link describes a relationship among business entities, business services and operations at different granularities.

19. The system of claim 15, wherein an event list is used to capture said event/action mappings for event driven composition of business process flow.

20. The system of claim 15, wherein said Requirement Annotation is used to generate a search script to perform a multiple search query via an advanced Web Service discovery engine, said Web Service discovery engine dynamically finding a narrowed-down list of Web services needed to compose the optimal business process.

21. The system of claim 13, wherein said optimization algorithm is a Genetic Algorithm, and a Web services cluster is represented as a single "gene" and a business process is represented as a single "chromosome" having a plurality of "genes" within said Genetic Algorithm, and wherein an optimal chromosome is converted back to the optimal business process after application of the Genetic Algorithm.

22. The system of claim 12, further comprising the step of providing an output adaptor to automatically convert the optimal business process into a flow language.

23. A computer readable medium containing code for composing an optimal business process using existing Web services, the code further comprising:

first code for capturing customer business requirements;

second code for recording said business requirements in a uniform representation, said uniform representation using a standard vocabulary of terms for specifying tasks satisfying said business requirements and using a language structure for relating said specified tasks in a business process flow;

third code for automatically generating a search script from said uniform representation, said search script being usable by Web services to identify one or more service providers for each of said specified tasks, said one or more identified service providers being placed on a qualified service list for said specified task;

fourth code for using an optimization algorithm to automatically select a service provider for each task from said respective qualified service list, said optimization algorithm optimizing said business process flow; and fifth code for automatically transforming the optimal business process into a business process flow language for execution.

* * * * *